US011681511B2

(12) United States Patent
Arora et al.

(10) Patent No.: US 11,681,511 B2
(45) Date of Patent: Jun. 20, 2023

(54) SYSTEMS AND METHODS FOR BUILDING AND DEPLOYING MACHINE LEARNING APPLICATIONS

(71) Applicant: Sway AI Inc., Chelmsford, MA (US)

(72) Inventors: Jitender Arora, Westford, MA (US);
Amir H. Atai, New Boston, NH (US);
Michael Piecuch, Cary, NC (US);
Hassan Ahmed, Concord, MA (US)

(73) Assignee: Sway AI Inc., Chelmsford, MA (US)

( * ) Notice: Subject to any disclaimer, the term of this patent is extended or adjusted under 35 U.S.C. 154(b) by 8 days.

(21) Appl. No.: 17/560,576

(22) Filed: Dec. 23, 2021

(65) Prior Publication Data

US 2022/0206774 A1 Jun. 30, 2022

Related U.S. Application Data

(60) Provisional application No. 63/130,472, filed on Dec. 24, 2020.

(51) Int. Cl.
*G06K 9/62* (2022.01)
*G06F 9/445* (2018.01)
*G06F 16/22* (2019.01)
*G06F 9/455* (2018.01)
*G06F 8/60* (2018.01)
(Continued)

(52) U.S. Cl.
CPC .............. *G06F 8/60* (2013.01); *G06F 9/4881* (2013.01); *G06N 20/00* (2019.01)

(58) Field of Classification Search
CPC . G06F 16/221; G06F 8/36; G06F 8/60; G06F 18/217; G06F 18/40; G06F 9/4881; G06N 20/00
See application file for complete search history.

(56) References Cited

U.S. PATENT DOCUMENTS 10,789,509 B2 * 9/2020 Chan .................... G06F 16/221
2016/0011905 A1 1/2016 Mishra et al.
(Continued)

OTHER PUBLICATIONS

Invitation to Pay Additional Fees dated May 6, 2022, in connection with International Application No. PCT/US2021/065042.
(Continued)

*Primary Examiner* — Thuy Dao
(74) *Attorney, Agent, or Firm* — Wolf, Greenfield & Sacks, P.C.

(57) ABSTRACT

According to some aspects, techniques are provided for building and deploying a machine learning application that do not require a user to have expert knowledge of machine learning or programming. These techniques may be executed by a system that provides a graphical user interface which allows a user to visually define a workflow for a machine learning application, without requiring the user to be an expert in machine learning. The system may automatically represent the workflow as a specification that may be used to build and deploy a machine learning application. The system may automatically execute the workflow in a series of stages while managing data flow and execution context between the stages. Such an execution process may provide flexibility in execution so that a user can build a complex machine learning application without it being necessary for the user to have detailed knowledge of how execution is managed.

22 Claims, 16 Drawing Sheets

(51) Int. Cl.
    *G06F 9/48*      (2006.01)
    *G06N 20/00*    (2019.01)

(56) References Cited

U.S. PATENT DOCUMENTS

| | | |
|---|---|---|
| 2018/0053328 A1 | 2/2018 | Simonovic et al. |
| 2022/0206773 A1 | 6/2022 | Arora et al. |

OTHER PUBLICATIONS

International Search Report and Written Opinion dated Jun. 28, 2022, in connection with International Application No. PCT/US2021/065042.

\* cited by examiner

SYSTEMS AND METHODS FOR BUILDING AND DEPLOYING MACHINE LEARNING APPLICATIONS

CROSS-REFERENCE TO RELATED APPLICATIONS

This application claims the benefit under 35 U.S.C. § 119(e) of U.S. Provisional Application No. 63/130,472, filed Dec. 24, 2020, titled "Workflow and Orchestration Software Engine for Auto AI/ML Platform," the entire content of which is incorporated herein by reference.

BACKGROUND

Machine learning techniques are utilized in a wide range of applications and fields. To effectively deploy a system that performs machine learning tasks, trained data scientists, data engineers and software engineers need to build machine learning infrastructure and deploy a machine learning model to suit a target application. For instance, deploying a machine learning system to process image data in facial recognition will generally require a number of manual steps. These steps may, depending on the target application, include selecting/configuring machine learning models for extracting suitable facial features from input image data, training the machine learning models and tuning the machine learning models.

SUMMARY

The present disclosure relates to techniques for building and deploying machine learning applications. The techniques provide computerized methods, systems and computer readable medium configured for deploying machine learning applications according to respective machine learning workflow specifications. Each machine learning workflow specification may define a plurality of components of a corresponding machine learning workflow and define one or more connections between the plurality of components. Each of the plurality of components may define an operation to be performed on data and have an associated context. Each of the one or more connections may define a flow of data between components when the corresponding machine learning workflow is executed.

Some embodiments are directed to using one or more processors to: identify a first group of one or more components of a first machine learning workflow as being associated with a first context, based on a first machine learning workflow specification that represents the first machine learning workflow; execute, or cause execution of, the one or more components of the first group in an order according to one or more connections between the one or more components of the first group as defined by the first machine learning workflow specification; identify a second group of one or more components of the first machine learning workflow as being associated with a second context, based on the first machine learning workflow specification; and execute, or cause execution of, the one or more components of the second group in an order according to one or more connections among the one or more components of the second group as defined by the first machine learning workflow specification.

Each of the plurality of components of the first machine learning workflow comprises an input data port and an output data port. Each connection of the one or more connections between the plurality of components defines a flow of data from an output data port of one component of the plurality of components of the first machine learning workflow to an input data port of another component of the plurality of components of the first machine learning workflow.

Some embodiments are directed to using one or more processors to deploy one or more machine learning applications, each machine learning application configured to process input data using a respective machine learning model to generate output data. The one or more processors receive user input defining at least a portion of a first machine learning application, the portion of the first machine learning application comprising a first component, the first component defining a first data type as input to the first component and identifying input data having the first data type; automatically select a machine learning model for the first machine learning application by: (1) identifying one or more machine learning models each associated with the first data type; (2) for each of the one or more machine learning models associated with the first data type, generating a respective metric value indicating a performance of the machine learning model over at least a first portion of the input data having the first data type; and (3) selecting a machine learning model from among the one or more machine learning models by comparing metric values generated for each of the one or more machine learning models. The one or more processors further configure the first component of the first machine learning application so that the first component is configured to utilize the selected machine learning model.

The foregoing apparatus and method embodiments may be implemented with any suitable combination of aspects, features, and acts described above or in further detail below. These and other aspects, embodiments, and features of the present teachings can be more fully understood from the following description in conjunction with the accompanying drawings.

BRIEF DESCRIPTION OF THE DRAWINGS

Additional embodiments of the disclosure, as well as features and advantages thereof, will become more apparent by reference to the description herein taken in conjunction with the accompanying drawings. The components in the figures are not necessarily to scale. Moreover, in the figures, like-referenced numerals designate corresponding parts throughout the different views. For purposes of clarity, not every component may be labeled in every drawing.

DETAILED DESCRIPTION

Figure 1A:
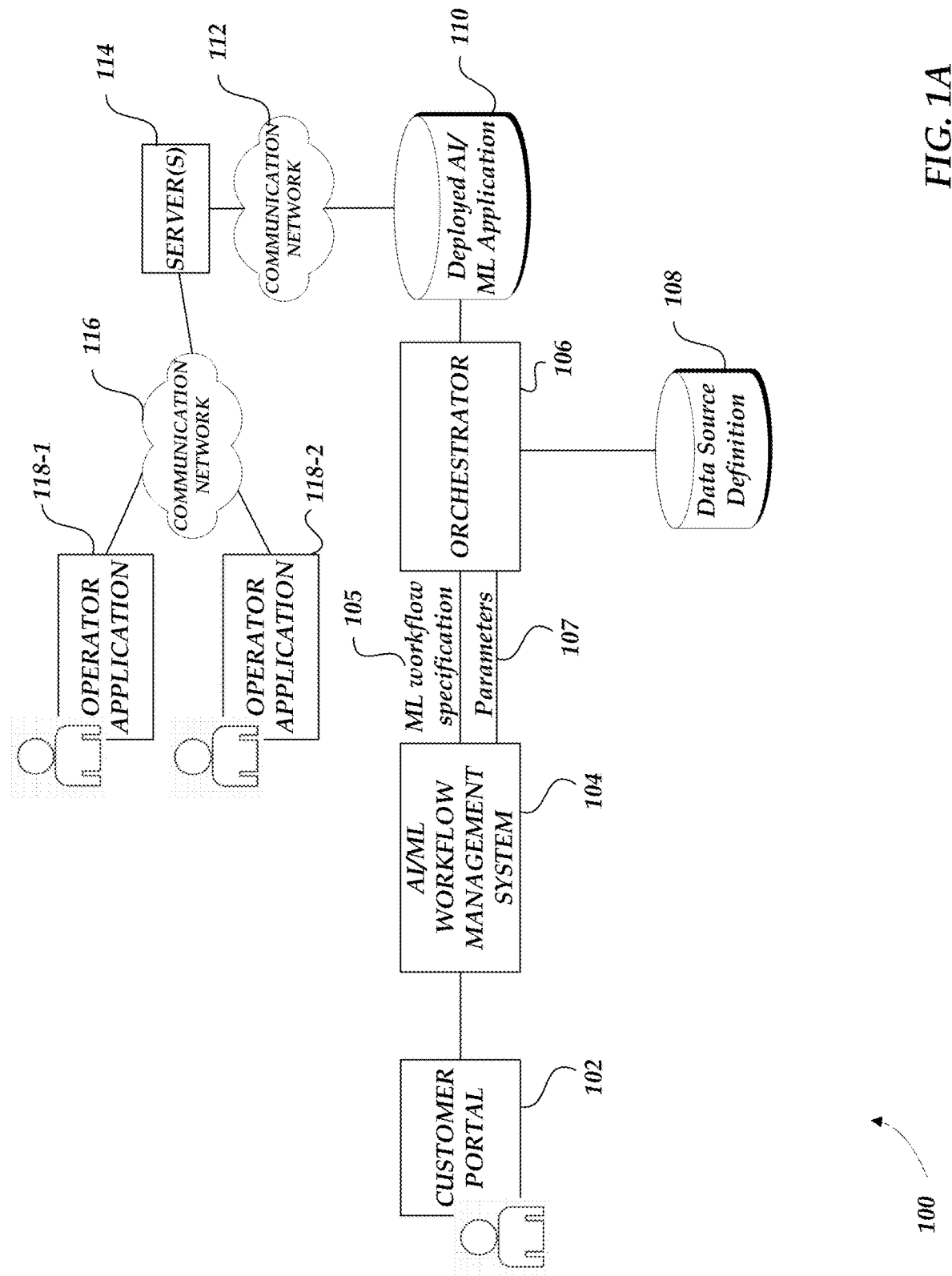
FIG. 1A depicts an illustrative machine learning workflow system suitable for building and deploying a machine learning application, according to some embodiments.

Building and deploying machine learning applications involve various engineering steps. For example, a data scientist or a system engineer may need to select a suitable machine learning model (or models) for a particular task, utilizing their knowledge of different machine learning models to select an effective model for that task. The engineer may also need to identify various data sources for training the machine learning model (also referred to herein as "training data"), and may need to configure the system to perform numerous steps of data preprocessing and/or data cleansing to properly prepare training data for use. The engineer may further need to train the machine learning model and/or properly tune parameters of the machine learning model so that an effective model is generated. Even once trained, a trained machine learning model must be deployed and a deployed machine learning application including the trained machine learning model may require proper understanding of the model and its input data to be used for retraining the system.

As a result, building and deploying a machine learning application generally requires expert knowledge about various machine learning techniques, and often requires that users write hundreds or thousands of lines of code to build the system. Moreover, a high level of expertise is required to access and operate the machine learning application, even once it is built, trained and deployed.

In addition, a conventional machine learning application is built to be configured and tuned for a specific purpose. In practice, a user may need to re-configure the system from time to time, however. Yet due to the above-described process by which the application is built, adapting or otherwise changing the way the application is tuned can require a great deal of time and expertise. For instance, a reconfiguration may require a user to re-build the system and/or even re-write some of the code. Even for a small change, such as adding new training data, adding email notification when an anomaly is detected in a machine inspection application, or changing the input data type etc., an engineer having expertise in machine learning and programming may be needed to reconfigure the system.

The inventors have recognized and appreciated techniques for building and deploying a machine learning application that do not require a user to have expert knowledge of machine learning techniques or programming skills. These techniques may be executed by a system that provides a graphical user interface which allows a user to visually define a workflow for a machine learning application, without requiring the user to be an expert in machine learning or programming. The system may automatically represent the workflow as a specification that may be used to build and deploy a machine learning application. In some embodiments, the system may automatically execute the workflow in a series of stages while managing data flow and execution context between the stages. Such an execution process may provide flexibility in execution so that a user can build a complex machine learning application without it being necessary for the user to have detailed knowledge of how execution is managed. In some embodiments, the system may automatically select a machine learning model for a user based on user's data, including consideration based on the type of data (e.g., image, text, etc.) and/or based on how various machine learning models are capable of handling any particular type of data (e.g., based on one or more performance metrics).

According to some embodiments, a machine learning workflow may describe a number of operations on data that are to be performed in a particular order. As such, the workflow may describe both the operations and an order (e.g., a control flow) in which the operations are to be performed. The operations may, for instance, include data preparation operations, data labeling, machine learning model training using training data, etc. The workflow may, in some cases, allow for parallel execution of operations so that multiple parallel streams of operations may be performed with each stream having a number of operations that are to be executed in order.

According to some embodiments, the system may include a machine learning workflow management system that manages the execution of a machine learning workflow in stages. The workflow management system may be configured to identify groups of one or more operations of a machine learning workflow as being associated with respective contexts, and execute the operations in each context in a dynamic orchestrator separately. Such execution may be sequential so that execution of one group of operations completes before execution of the next group begins. The workflow management system and/or the orchestrator may determine that execution of the operations of a first group are completed before executing the one or more operations of the second group in association with the second context. Alternatively, and/or additionally, the execution of operations associated with different groups may be performed with at least part of the execution within one group overlapping in time, at least in part, with execution within another group.

According to some embodiments, executing the machine learning workflow in stages may have various advantages. In particular, execution each operation, or group of operations, of the machine learning workflow in stages may allow for some of the workflow to be executed on a local server or a remote server, and either synchronously or asynchronously. For example, one stage of a workflow may perform data labeling via crowdsourcing, where the workflow system may interact with the crowdsourcing platform/service and complete the labeling in an asynchronous fashion, whereas another stage may perform data manipulation synchronously on a local server. Moreover, various operations of the workflow may have different requirements for which different resources are desirable (e.g., different CPU speeds and/or available memory amounts). For example, preparing data can be performed on a comparatively low speed CPU whereas training a machine learning model is desirably executed on a comparatively faster CPU or GPU. In addition, some operations may require a third-party provider and may be best performed in an asynchronous manner.

According to some embodiments, the system may be configured to manage the data flow among the various contexts. In some embodiments, the system may detect context boundaries by determining whether an output of an operation associated with a context in the workflow will be provided as input to another operation associated with another context. In response to determining that an output of one operation associated with a context is provided as input to an operation associated with another context, the system may configure execution of the operation so that the output of the operation is stored in a shared storage. A shared storage may be a memory/storage that can be shared by different components (across context boundaries). In some examples, a shared storage may include a non-volatile memory or external device that stores data, a file, or a pointer to another data source. The shared storage may be accessed by other operations locally and/or remotely. In the example above, another operation may be executed by accessing the output data from the one operation in the shared storage. In another example, the labeled data that are provided by a third-party may be stored in a shared memory for access by other operations in the workflow. The use of shared storage across context boundaries allows operations of different contexts to share data that are generated by different processors synchronously or asynchronously.

According to some embodiments, a machine learning workflow may be represented by a plurality of components, and connections between the components. Each component may be configured to perform an operation on data that flows into the component, and/or to produce data that then flows into another component. Components may also include one or more parameters so that operation of the component can be configured by the user. As such, a machine learning workflow may define a plurality of components, with each of the plurality of components defining an operation to be performed in building and deploying the machine learning application. A machine learning workflow may also define one or more connections, where each of the one or more connections defines a flow of data between components when the machine learning workflow is executed. For example, a connection may define a data flow from a first component to a second component. In executing the machine learning workflow, the first component may be executed to generate output data, which may be provided to the second component as input data. The second component may be executed using the input data generated from the first component. The workflow may be defined by a user and displayed via a suitable graphical user interface (GUI), with components and connections shown in the GUI as will be described further below.

According to some embodiments, a machine learning workflow may be internally represented by the system as a machine learning workflow specification. When a user accesses a GUI to define the workflow, the system may generate the machine learning workflow specification based on components and connections between the components that the user adds to the workflow. When instructed to by the user, the system may execute the workflow by executing operations corresponding to the plurality of components in the workflow according to the machine learning workflow specification. The operations may be executed in an order that is suitable for deploying a machine learning application, such as in a sequence as defined by the components and the connections between them.

As discussed above, in some embodiments the system may identify one or more machine learning models (e.g., based on matching the data type associated with the machine learning models to user's data), and automatically select a suitable machine learning model. With respect to the GUI discussed above, for instance, a user may configure a portion of a machine learning workflow via the GUI, then select a component for training of a machine learning model. In some embodiments, the system may automatically select a suitable machine learning model for this component, and automatically configure at least a portion of the component to utilize the selected model.

In some embodiments, automatic selection of a machine learning model may be based on input data to the machine learning workflow identified by the user. The input data may be analyzed for data type and/or for its performance on one or more machine learning models, and the most appropriate model selected by the system. In some embodiments, in automatically selecting the machine learning model for the machine learning application, the system may identify one or more machine learning models each associated with a data type. For example, a facial recognition model may be associated with images. In this case, the system may identify one or more machine learning models associated with images. For each of the one or more machine learning models associated with the data type, the system may generate a respective metric value indicating a performance of the machine learning model over the input data; and select a machine learning model from among the one or more machine learning models by comparing metric values generated for each of the one or more machine learning models.

In a non-limiting example, in identifying one or more machine learning models, the system may select one or more regression models that are suitable for the component of the machine learning application, for example, by matching the data type required for the regression models to the data type of the component. Subsequently, the system may execute the identified machine learning models and compare their performance metric values.

Following below are more detailed descriptions of various features related to, and embodiments of, techniques for building and deploying a machine learning application. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

FIG. 1A depicts an illustrative machine learning workflow system suitable for building and deploying a machine learning application, according to some embodiments. Machine learning workflow system 100 includes a customer portal 102 that may be used to access an AI/ML workflow management system 104. The customer portal 102 may be configured to receive user input and provide said input to the AI/ML workflow management system 104, thereby allowing the user to define a machine learning workflow for building and deploying a machine learning application. AI/ML workflow management system 104 may be configured to manage the machine learning workflow, including storing available components for the user to define the machine learning workflow, rule checking, and executing the workflow. As discussed above, a machine learning workflow specification may represent the machine learning workflow as defined by the user. Execution of a machine learning workflow by the orchestrator 106 will be described below in relation to FIG. 1B.

In the example of FIG. 1A, orchestrator 106 may be configured to execute a portion of a workflow identified by the AI/ML workflow management system 104 and according to a machine learning workflow specification 105. In some embodiments, a portion of a workflow (e.g., one or more components of the workflow) may be associated with a respective context. Orchestrator 106 may be configured to execute multiple portions of a workflow in sequence, with the portions of the workflow associated with each context being executed sequentially. As discussed above, execution of the contexts may proceed consecutively with execution of each context being completed before execution of the next context begins, or may be executed at least partially overlapping in time. Completing execution of the contexts associated with a machine learning workflow may produce a built and deployed machine learning application 110.

As used herein, "deploying" a machine learning application may refer to preparing a machine learning application for execution in the field. For example, a machine learning application may reside on a local server, or on a remote server on the cloud. The machine learning application may include a trained machine learning model configured to process input data to generate output data. In some embodiments, deploying a machine learning application may also include verifying and monitoring the deployed machine learning model in the machine learning application. For example, the system may test and/or monitor the trained machine learning model in the deployed machine learning application. The testing and monitoring may include executing the deployed machine learning application in a run-time environment and checking that the deployed machine application can process the associated data types and produce the correct result, for example.

With further reference to FIG. 1A, in a field application, an operator may use an operator application (e.g., operator application 118-1 or 118-2) executing on an operator device (not shown in FIG. 1A) to interact with the machine learning application, such as providing new input data (e.g., captured images) to the machine learning application, displaying the result from the machine learning application, and/or receiving alerts triggered by the machine learning application. As discussed above, a machine learning workflow may refer to a process that includes multiple operations to build and deploy a machine learning application. When the machine learning workflow is executed, the multiple operations in the workflow are automatically performed to build and deploy the machine learning application. In some use cases, the deployed machine learning application may be saved in the system for the user to perform further machine learning tasks. Alternatively, and/or additionally, the system may upload the deployed machine learning application to one or more servers (e.g., server(s) 114) via a communication network 112, where the deployed machine learning application may be executed by any user.

With further reference to FIG. 1A, in some non-limiting examples, the one or more servers 114 may be on a cloud and are accessible by one or more operator applications (118-1, 118-2 etc.) via a communication network 116. An operator application may be running on an electronic device associated with the operator and configured to interact with the server(s) 114 to provide the field data to the deployed machine learning application, where the deployed machine learning application is executed using the field data to perform a machine learning task. The operator application (e.g., 118-1, 118-2) may retrieve the results of the machine learning application and display the results on the electronic device.

In the example of FIG. 1A, customer portal 102 may include any suitable front end software suitable for accessing a back end server hosting the AI/ML workflow management system 104, such as a thin client, a web portal, etc., and that may provide a graphical user interface to a user accessing the portal. In some embodiments, customer portal 102 may comprise a web portal that allows users to access AI/ML workflow management system 104 via a browser executing on a suitable electronic device. In some cases, a user's device may access the customer portal 102 via a communication network, such as the Internet. In other embodiments, customer portal 102 may be a thin client application running on a user's electronic device, where the electronic device may be configured to access the machine learning workflow system 100 via a communication network. In some embodiments, customer portal 102 may include a graphical user interface that allows the user to provide input to the AI/ML workflow management system and thereby define a machine learning workflow.

As described above, a machine learning workflow may define a plurality of components, with each of the plurality of components defining an operation to be performed in building and deploying the machine learning application. Thus, in defining the machine learning workflow, customer portal 102 may be configured to allow a user to select one or more components that are needed in building and deploying a machine learning application. The user may also define one or more connections between the components, where each of the one or more connections defines a flow of data between components when the machine learning workflow is executed. The details of customer portal will be further described with reference to FIG. 5 below.

According to some embodiments, AI/ML workflow management system 104 may be configured to pre-store (or otherwise have access to) a library of components for building and deploying machine learning applications. For example, the system 100 may include a set of supported components for presenting through the customer portal 102. In some embodiments, each component may be stored as a node with associated node definition data. Node definition data may include information about the component such as the operation to be performed when the workflow is executed, input data port(s) and output data port(s) with each such port associated with a data type (e.g., text, image, etc.), and properties associated with the component.

In some embodiments, node definition data for defining components in a workflow may be stored in (or otherwise described by) a schema. When a component is selected by the user (e.g., by providing input through customer portal 102), the AI/ML workflow management system 104 may retrieve the schema associated with the component to generate a representation for the component for displaying through a graphical user interface rendered by the customer portal. For example, the representation of a component may include the associated input data port(s) and output data port(s), which when displayed (e.g., via customer portal 102), allows the user to make connections between components by connecting the input/output data ports between the components. The examples of components and connections are further described in detail with reference to FIGS. 2A and 5.

In the example of FIG. 1A, AI/ML workflow management system 104 may be configured to perform validation of components and connections between the components as defined by user input provided to the customer portal 102 (e.g., via a graphical user interface provided by customer portal 102). In some embodiments, at least some input data ports and/or output data ports associated with a given component may have an associated data type (e.g., image data, text data, columnar data, etc.). In validating a connection that connects one component to another, the AI/ML workflow management system 104 may check whether the data type of the output data port of one component of the connection matches the data type of the input data port of another component of the connection. In response to determining a match, the system may validate the connection.

In the example of FIG. 1A, the system 100 may save and manage a workflow defined by a user (e.g., defined through user input provided to the customer portal 102), and may execute the defined workflow to deploy a machine learning application 110. In some embodiments, each of the components in a workflow may be represented by the AI/ML workflow management system 104 as a node of a graph, and the connections between the components in the workflow may be represented as edges in the graph. Thus, the AI/ML workflow management system 104 may represent a workflow using a visual graph, such as the example shown in FIG. 5 and discussed below. In some embodiments, the AI/ML workflow management system 104 may represent a workflow as a machine learning workflow specification 105, which defines the components selected by the user to building and deploying a machine learning application and one or more connections between the components. When recording a workflow to a computer readable storage medium, the workflow may be represented in any suitable way, including as a machine learning workflow specification, and/or as data that describes components and connections as nodes and edges of a graph.

In the example of FIG. 1A, the workflow specification 105 may be represented and stored in a suitable computer readable storage medium in any suitable data format, including but not limited to, markup files (e.g., eXtensible Markup Language (XML)), files including name/value pairs (e.g., JavaScript Object Notation (JSON)), database files, or combinations thereof. In some embodiments, the workflow specification may be compressed and/or encrypted, which may allow efficient communication among different processes or functional blocks in the system. As one example of a suitable workflow specification, the workflow specification may comprise a serialized (e.g., concatenated) workflow string containing information about a workflow defined by the user. Such a string may be stored in any suitable format, including XML and/or JSON. The information in the serialized workflow string may define in any suitable way the components, and connections between the components. The workflow specification may also include other parameters associated with the components or connections. For example, in defining the workflow, the user may enter some parameters for a component (e.g., a data source for training data for a training component). The workflow specification may be accessed by the AI/ML workflow management system, and/or shared among one or more orchestrators (e.g., orchestrator 106).

In some embodiments, AI/ML workflow management system 104 may be configured to execute components in a workflow to build and deploy the machine learning application 110. Execution of the workflow may be performed according to the machine learning workflow specification. In some embodiments, the components in a workflow may be executed in stages. For example, the AI/ML workflow management system may identify groups of one or more components of a machine learning workflow as being associated with respective contexts, and execute the operations in each context separately.

As discussed above, a context may refer to a stage in deploying a machine learning application, where the stages in deploying the machine learning application may be performed in sequence. FIG. 2B illustrates a non-limiting example order of contexts that may be executed in a machine learning workflow system, according to some embodiments. An order of contexts 250 may include data ingestion 252, data processing 254, labeling 256, training 258, evaluation 260, inference 262, business logic 264, and/or deployment 266. In some embodiments, deployment 266 may include deploying a machine learning application, verifying and monitoring the machine learning model in the deployed machine learning application. The order of these contexts (e.g., as defined by a workflow specification) may define the order of execution of the plurality of components in a workflow based on the associated context of each of the plurality of components. For example, a first group of one or more components may be associated with the training context; a second group of one or more components may be associated with the labeling context; and a third group of one or more components may be associated with the evaluation context. In executing the workflow, the first, second, and third groups of components may be executed in the order of their associated contexts. According to the above example listing of contexts, the first, second and third components may be executed in the order of: first group of one or more components, second group of one or more components, followed by the third group of one or more components in line with the order of their associated contexts: labeling, training, and evaluation.

When one or more components associated with a given context are executed, the portion of system 100 (e.g., orchestrator 106) executing the operations associated with those components may dynamically load only those libraries required for those operations. This approach may allow a portion of a workflow (the portion associated with the given context) to run efficiently on the computer without loading resources (e.g., memory allocation) that are not needed. This results in a saving of computing resources (e.g., memory) when some components associated with other contexts are not being executed. The system may further execute different contexts of a workflow using different computing resources. This may allow the system to run more efficiently as some contexts (e.g., training context) may require significant computing resources, whereas other contexts (e.g., data preparation) may require less than significant computer resources. Additionally, some contexts (e.g., data processing) may be executed synchronously, whereas other contexts (e.g., data labeling) may be executed asynchronously using a third-party service. Thus, orchestrator 106 may be executed in different computing environment (e.g., on different computing systems, by different processors having different speed), and may be executed synchronously or asynchronously, depending on the context of the workflow being executed.

In some embodiments, orchestrator 106 may be generated dynamically by AI/ML workflow management system 104. When a workflow is being executed, the AI/ML workflow management system 104 may identify one or more components associated with each respective context, and generate the orchestrator that is configured to execution only a portion of the workflow corresponding to a given context. AI/ML workflow management system 104 may cause the orchestrator 106 to execute the portion of the workflow for the given context. Additionally, AI/ML workflow management system 104 may also provide information to the orchestrator 106, such as the machine learning workflow specification (or a location where the specification is stored) and/or any parameters associated with one or more components in the context to be executed. Data exchanged between different contexts (or different executions of orchestrator) may be viewed as data across context boundaries, and may be saved to a shared memory. As described above, a shared storage may be a memory/storage that can be shared by different components and that may be accessed by other operations locally and/or remotely. The use of shared storage across context boundaries allows operations of different contexts to share data that are generated by different processors synchronously or asynchronously. The details of executing the orchestrator 106 are further described with reference to FIGS. 1B and 1C.

In some embodiments, system 100 may further include one or more data source definitions 108, which may be accessed by orchestrator 106 for executing a given context of the workflow. In some embodiments, data source definition 108 may include (or may otherwise identify) the libraries that may be needed to execute any of the components in a given context, where the libraries may be dynamically loaded to the system depending on the context to be executed. Additionally, or alternatively, data source definition 108 may also include data and/or locations or other pointers to stored data that may be needed to execute any of the components in a workflow. Such data may include training data, data for labeling, data for testing and evaluation, and/or any other suitable data. Data as stored and/or identified by data source definitions 108 may be stored in various databases and in various format, such as Amazon S3, SQL, HDFS, NFS storage, DynamoDB, and/or a combination thereof, and/or other suitable databases and database formats.

Accordingly, the various techniques described above may be implemented to provide a machine learning workflow system that includes a machine learning workflow management system configured to allow a user to define a machine learning workflow for building and deploying a machine learning application (e.g., via customer portal). In some embodiments, the system may guide the user to select a plurality of components that need to be executed in building and deploying the machine learning application.

For example, to deploy a facial recognition system, a user may select several components in the workflow, including preparing training data containing facial recognition training images, selecting a machine learning model for facial recognition, training the machine learning model using the training data, evaluating the trained machine learning model, configuring business logics such as notification upon detection of certain subjects, and deploying the machine learning model. Additionally, the system may allow the user to define one or more connections, where each connection connects an output of one component to an input of another component, to form the machine learning workflow. The system may execute the facial recognition workflow to deploy the facial recognition application, for example, on the cloud. In executing the workflow, the system may identify one or more components in the user defined workflow for group of contexts (e.g., one or more of the contexts shown in FIG. 2B) and configure the orchestrator to execute each respective context. As described, each context may be executed in a different computing environment (e.g., having a processor with different speed, and different memory, different storage capacities). Each context may be executed synchronously or asynchronously. For example, data labeling may be outsourced to a third party. Accordingly, the system may interface with a third-party portal and transmit the data to be labeled to the third-party portal.

Once the application is deployed, other users, e.g., an operator at a border control station may use an operator application (e.g., running on a system at the border control) to interact with the facial recognition application on the cloud, via a communication network. The operator application may send captured images of travelers to the facial recognition application, receive the result of the facial recognition application, and display the result on the operation application. Additionally, or alternatively, upon detection of a suspect subject by the facial recognition, the operator and/or a supervisor at border control may receive an alert (for example, via an internal alert system). The notification to the operator and/or the supervisor may be configured in the business logic context as part of the workflow described above. Now, some features of the machine learning workflow system are further described in detail.

Figure 1B:
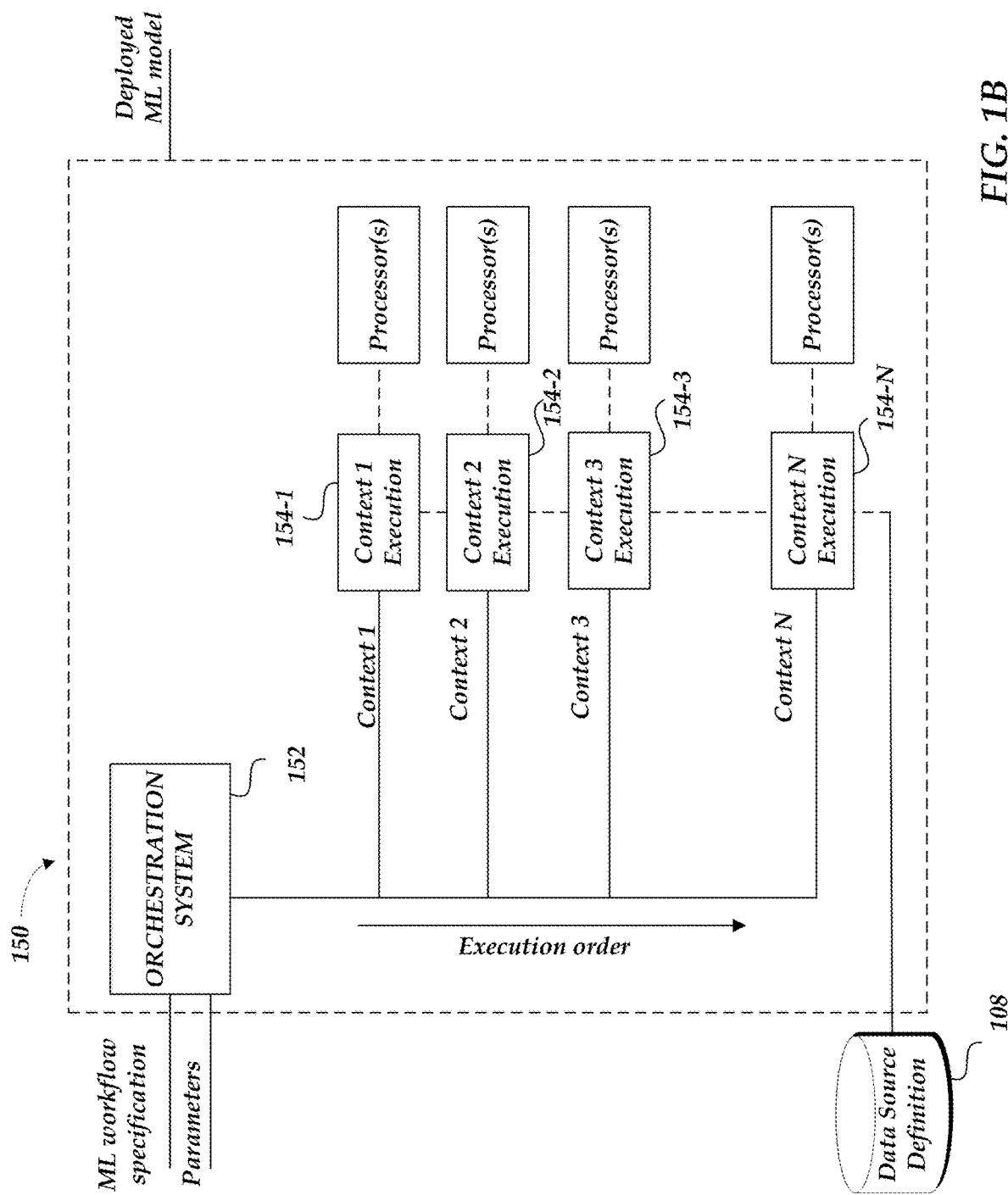
FIG. 1B depicts an illustrative orchestrator that may be implemented by a suitable machine learning workflow system, according to some embodiments.

FIG. 1B depicts an illustrative orchestrator that may be implemented by a suitable machine learning workflow system, according to some embodiments. Orchestrator 150 may be implemented as orchestrator 106 in the machine learning workflow system 100, for example. In the example of FIG. 1B, orchestrator 150 includes an orchestration system 152, which may be a program (e.g., generated by AI/ML workflow management system 104) that is configured to execute one or more portions of the workflow (e.g., for each of one or more contexts). As such, orchestration system 152 may be configured to execute any one or more of the contexts (154-1, . . . 154-N) using one or more processors. As discussed further below, the processor(s) used to execute the operations for each context may be the same processor(s) or may be different processor(s). In some embodiments, orchestrator 150 may be configured to receive information about the workflow to be executed, such as machine learning workflow specification 105 and/or parameters 107 associated with one or more components in the workflow.

As described above, the machine learning workflow specification may include (or may otherwise identify) information about components and connections between the components in the user defined workflow. Orchestration system 152 may be configured to parse the machine learning workflow specification to retrieve the information needed for executing one or more portions of the workflow. In some cases, the orchestrator 150 may be configured to specifically execute operations of the one or more portions of the workflow. For example, orchestrator 150 may be configured to execute operations within a context of training a machine learning model. In this example, orchestration system 152 may receive the machine learning workflow specification (or data indicating a location of the specification) and parse the specification to retrieve information about components and connections associated with the training context, and use this information in executing the context. Additionally, or alternatively, orchestration system 152 may parse other parameters from the AI/ML workflow management system (e.g., 104 of FIG. 1A) about one or more components associated with the context. For example, the parameters may include parameter values entered by the user when defining the workflow, for example, via the customer portal (102 of FIG. 1A). In some embodiments, in executing a given context, orchestrator 150 may also access data source definition 108 to retrieve information needed for one or more components of the given context. For example, for a model evaluation context, the orchestrator may retrieve labeled data or a location of the labeled data from the data source definition 108.

It is appreciated that various techniques may be used to pass information between AI/ML workflow management system (104 of FIG. 1A) and orchestrator (106 of FIG. 1A). For example, the machine learning workflow specification may include information about components and connections for the entire machine learning workflow defined by the user. In such case, the orchestrator may parse the specification and retrieve only information needed for executing one or more components associated with a given context. Alternatively, the machine learning workflow specification may include only information about components and connections for a portion of the workflow that is associated with a given context and pass that specification to the orchestrator. In such case, a parser may not be needed in orchestrator. It is also appreciated that the parameters about one or more components in a workflow may be embedded in the machine learning workflow specification, or transferred between the AI/ML workflow management system and orchestrator separately.

With further reference to FIG. 1B, the orchestrator 150 may be allocated different computing resources depending on the context to be executed by the orchestrator 150. For example, contexts 154-1, 154-2, . . . 154-N may be designated to be executed on different processors. In a non-limiting example, operations for training a machine learning model in a workflow may be executed on comparatively faster processing resources because a training operation in deploying a machine learning application may benefit from a large number of iterations and thus significant computing resources. On the other hand, components for evaluating a machine learning model may not require as many iterations and can be implemented on comparatively slower processing resources. In some embodiments, the orchestrator may configure one or more operations to, when executed, interface with a third-party service (e.g., crowdsource, a cloud service etc.) to cause remote execution of at least some part of the one or more operations. For example, data labeling for deploying a machine learning application may be executed remotely by a third-party (e.g., a mechanical turk system). In such a case, instructions to execute operations corresponding to components in the data labeling context may be communicated to a third-party platform for execution asynchronously. As described above, the allocation of suitable computing resources based on contexts allows the system to utilize appropriate resources (e.g., processors of different capacities, local or remote processors, or asynchronous services) and thus deploy machine learning applications more efficiently. It is appreciated that various techniques may be used to allocate different computing resources to different contexts. For example, the allocation may be performed by AI/ML workflow management system (104 of FIG. 1A) or by orchestrator (150 of FIG. 1B).

With further reference to FIG. 1B, various contexts (e.g., 154-1, . . . 154-N) may be executed in an order such as the execution order shown. In such a manner, execution of one group of operations in one context may fully complete before execution of the next group of operations in the next context begins. The AI/ML workflow management system 104 as shown in FIG. 1A may determine the order and timing of execution of different contexts. In some embodiments, various contexts (e.g., 154-1, . . . 154-N) may be executed by a single orchestrator. In some embodiments, the AI/ML workflow management system may generate an orchestrator (e.g., 150 of FIG. 1B) and dynamically configure the orchestrator for executing a context in the sequence. For example, the system may generate an instance of the orchestrator for executing a first context in the sequence, then dynamically configure the orchestrator for executing the second context after the execution of the first context is completed.

In some embodiments, the AI/ML workflow management system 104 may generate multiple instances of the orchestrator (e.g., 150 of FIG. 1B), with each instance of the orchestrator configured to execute a respective context of the workflow (that is, multiple instances of the orchestrator shown in FIG. 1B with a single context 154 being executed rather than multiple contexts in sequence as shown). The AI/ML workflow management system may cause the multiple instances of orchestrator to execute in a sequence. It is appreciated that contexts of a workflow may be implemented with overlap in time. For example, the AI/ML workflow management system may cause multiple instances of the orchestrator to execute with different start times, where the execution of these multiple instances may overlap in time. In a non-limiting example, the labeling context may be executed (e.g., asynchronously) while at least a part of a training context that does not require labeling (e.g., unsupervised training) is executed simultaneously. In other examples, the system may generate an orchestrator and a mini-orchestrator configured to perform a subset of operations of the orchestrator.

According to some embodiments, an orchestrator may be configured to execute some portion of a workflow by making use of data created during a previous execution of the workflow. This process may allow a later portion of a workflow to be executed without it being necessary to re-execute an earlier portion of the workflow. As such, in some executions of a workflow, not all the operations, and not all contexts, may necessarily be executed. User input provided to the portal 102 may indicate that such a process is to be performed by identifying a component from which execution is to begin. The system 100 may confirm that suitable data is available for initiating execution from this component before doing so.

Figure 1C:
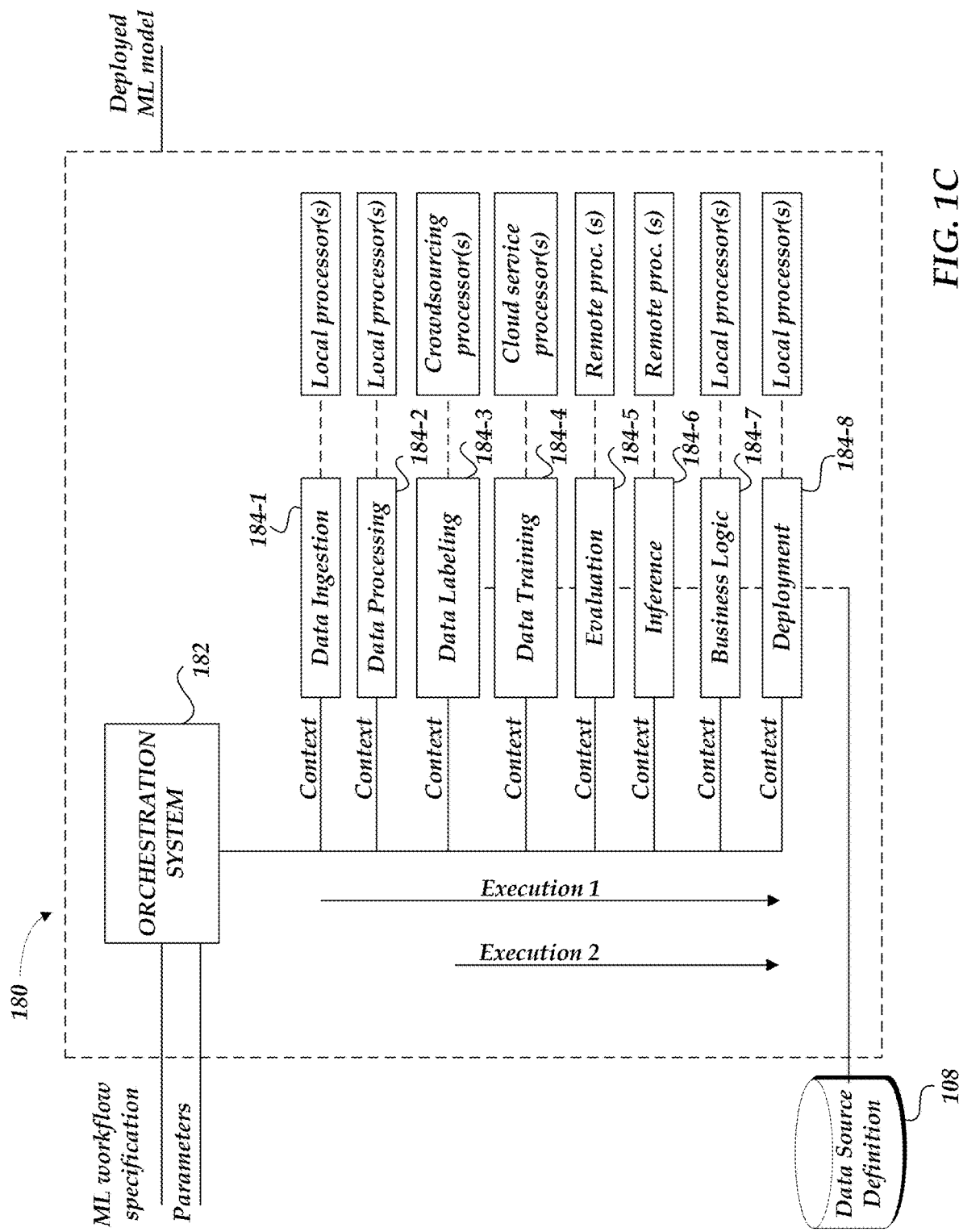
FIG. 1C depicts an illustrative implementation of the orchestrator shown in FIG. 1B, according to some embodiments.

FIG. 1C depicts an illustrative implementation of the orchestrator shown in FIG. 1B, according to some embodiments. Orchestrator 180 is an example of orchestrator 150 (of FIG. 1B) when executing a workflow to deploy a machine learning application. In the example of FIG. 1C, a single orchestrator is configured to execute operations for a workflow in each of 8 contexts as shown, although as discussed above some dynamic configuration of the orchestrator may occur during execution of operations for one or more of the contexts. Execution resources are shown in FIG. 1C for each context to illustrate suitable execution resources that may be used to execute the operations for the context. For instance, operations in the data ingestion context 184-1 may be executed using one or more processors local to system 100.

In the example of FIG. 1C, it may be desirable when deploying the machine learning application to execute different contexts 184-1, . . . 184-8 in different computing environments and/or using different computing resources. For example, contexts 182-1, 184-2, 184-7, and 184-8 may be executed on local processor(s), while contexts 184-5, 184-6 may be executed on remote processor(s). The terms "local" and "remote" may be relative and used to indicate a different execution environment. In some examples, a local processor may share the same processor with the AI/ML workflow management system such that the local processor may directly communicate with the AI/ML workflow management system without requiring any network, e.g., Internet. Conversely, a remote processor may be running independently from the AI/ML workflow management system and communicate with the AI/ML workflow management system via a network, such as Internet. In other examples, a local processor may include a processor running at the same site as the AI/ML workflow management system (even if a network is required between the local processor and the AI/ML workflow management system), whereas a remote processor may include a processor running at a different site from where the AI/ML workflow management system is running. In some embodiments, context 184-3 may be crowdsourced and implemented on crowdsourcing processor(s) at a third party's platform. Context 184-4 may be implemented on the cloud. The allocations of computing environments for different contexts are shown only for illustrative purposes, and it is appreciated that other techniques may be possible.

With further reference to FIG. 1C, when executing a workflow, various contexts or any portion of a workflow may be executed. As discussed above, an orchestrator may be configured to execute some portion of a workflow by making use of data created during a previous execution of the workflow. In the example of FIG. 1C, for instance, the AI/ML workflow management system 104 may configure a first instance of an orchestrator to execute the entire workflow in a first execution process, labeled "Execution 1" in the drawing. Subsequent to this execution, the user may then modify the workflow (e.g., using customer portal 102) with new training data. The AI/ML workflow management system 104 may then configure a second instance of an orchestrator to repeat only a portion of the workflow that will be affected by the new training data, in a second execution process, labeled "Execution 2" in the drawing. It is appreciated that other variations of executions of the workflow may be possible.

Figure 2A:
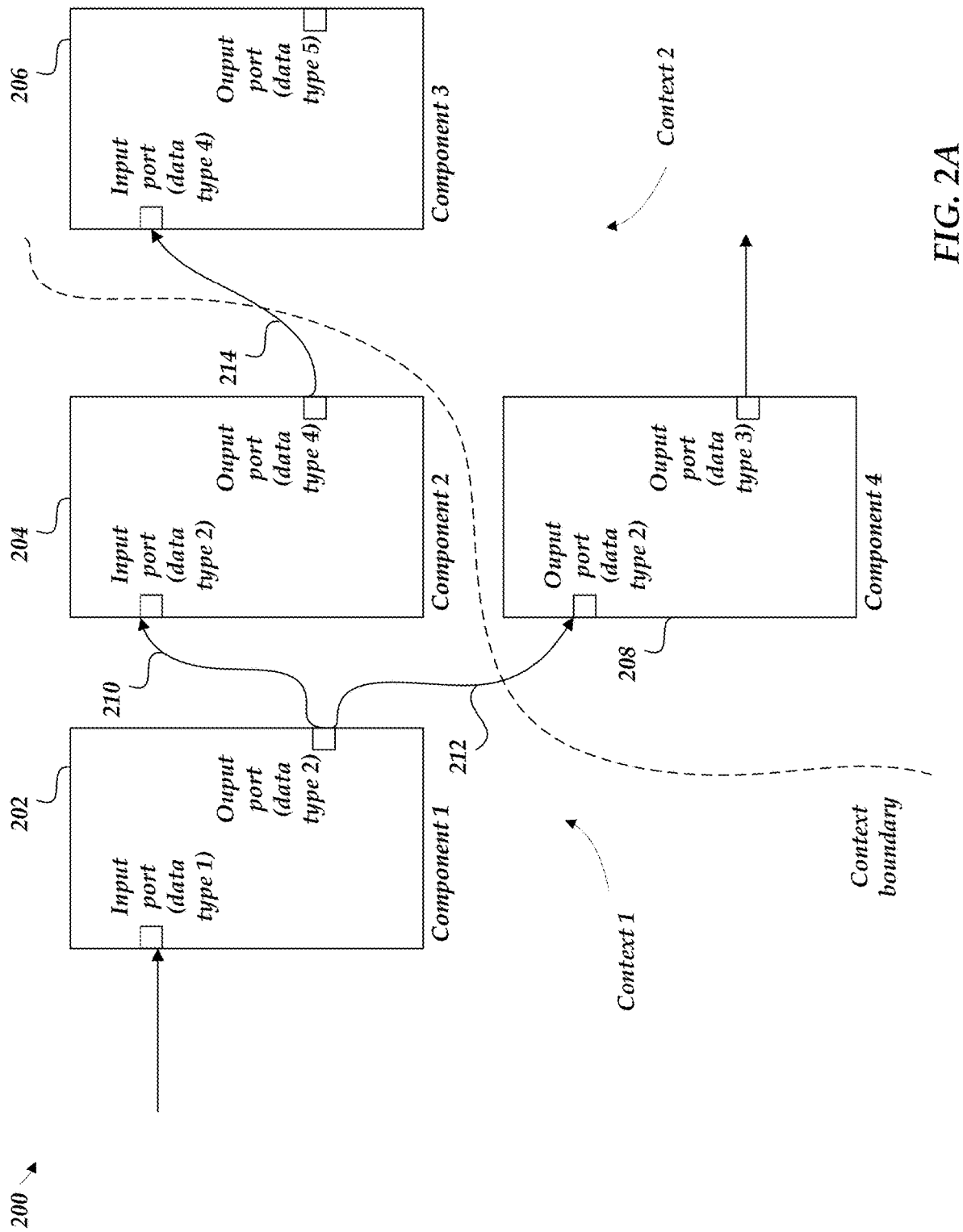
FIG. 2A depicts a portion of an illustrative machine learning workflow, according to some embodiments.
Figure 2B:
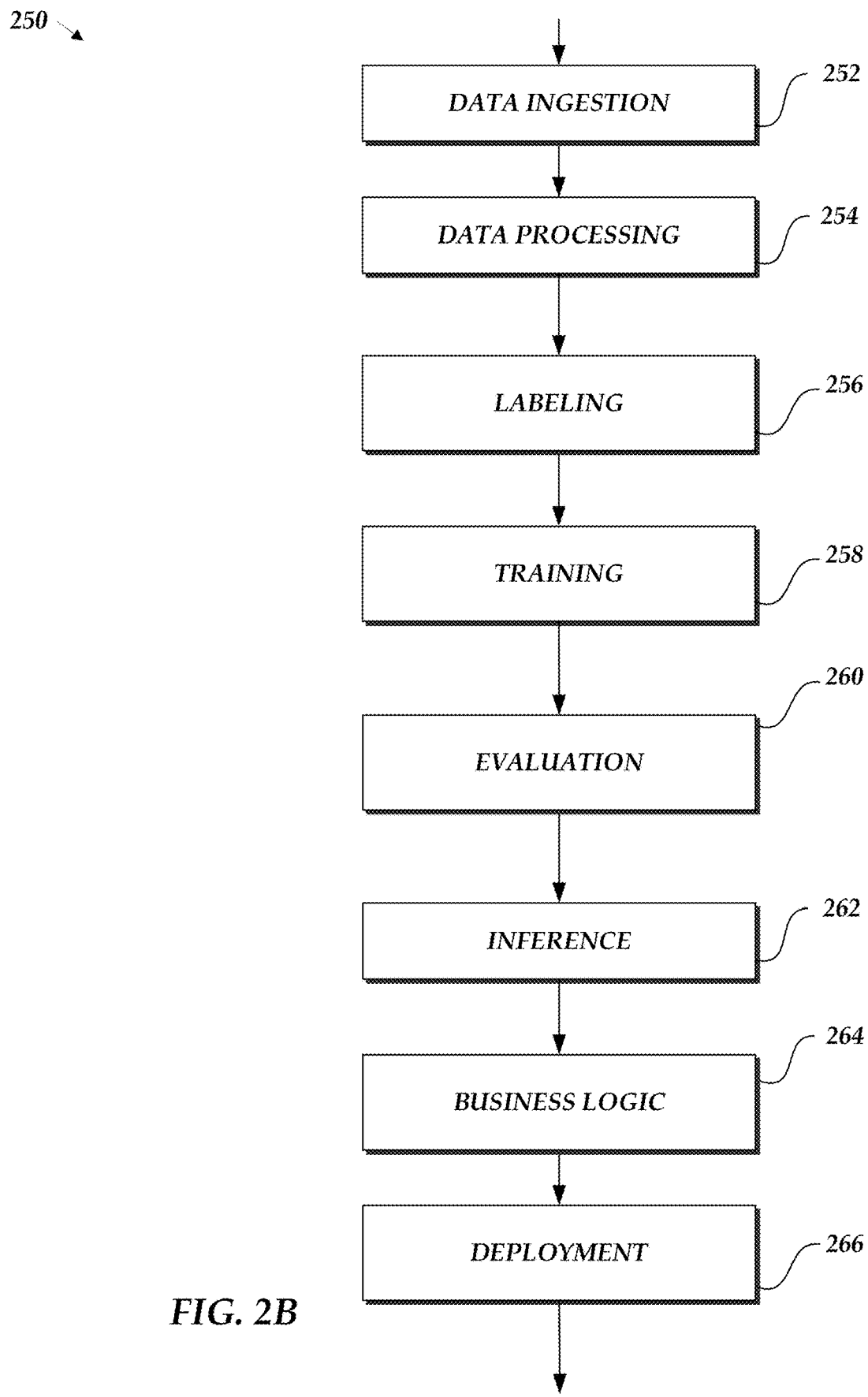
FIG. 2B depicts an illustrative order of contexts that may be executed by a machine learning workflow system, according to some embodiments.

FIG. 2A depicts a portion of an illustrative machine learning workflow, according to some embodiments. Workflow 200 includes components 202, 204, 206 and 208, with each component representing an operation to be performed in deploying a machine learning application. In the example of FIG. 2A, each of the components 202, 204, 206 and 208 has an input data port and an output data port, with each port being associated with a given data type. A component in a workflow may have multiple input or output data ports, or a component may have output data port(s) only. Illustrative workflow 200 includes connections 210, 212, 214, and 216, where each connection defines a flow of data from one component to another component. As described above, the connections may be defined by a user, for example, using customer portal 102 of FIG. 1A. The illustrative workflow 200 may be represent some or all of a workflow defined by the user.

In some embodiments, each of the components 202, 204, 206 and 208 may be associated with a context. For example, in the example of FIG. 2A, components 202 and 204 are associated with Context 1, whereas components 206 and 208 are associated with Context 2. As described above, grouping the components in a workflow allows the system to execute any portion of the workflow by context and use appropriate computing resources so that the system may run more efficiently.

When executing workflow 200, the system (e.g., AI/ML workflow management system 102 of FIG. 1A) may identify components 202 and 204 as belonging to Context 1 and components 206 and 208 as belonging to Context 2. As one example, a workflow specification may include data describing each of these components, and may further identify a context for each of these components, thereby allowing the system to parse the workflow specification to determine which contexts are present in the workflow. Identification of the context associated with each component may be based on information in the node definition of the component as described above, for example. Subsequently, the system may execute components in an order according to the contexts.

In the example of FIG. 2A, the system may execute components 202 and 204 associated with Context 1 first (e.g., by orchestrator 106 of FIG. 1A), followed by execution of components 206 and 208 associated with Context 2. In some embodiments, in executing a particular context, the system may execute the components in that context according to the connections between the components within that context (e.g., according to a control flow relationship defined by the components and the manner in which they are connected to one another). As part of this analysis by the system, the system may determine which components are connected to one another, and which component is connected by an output port and which by an input port. The type of port may imply an order of execution of these components. For example, in executing Context 1, the system may execute component 202 followed by execution of component 204, as defined by connection 210 (that is, the connection from an output port of component 202 to the input port of component 204 implies that component 204 should be executed after component 202). In some embodiments, only operations represented by components in a given context are performed and no other operations in other context will be performed. For example, model training (e.g., Context 2) in a workflow should not be performed during data processing in a map/reduce cluster (e.g., Context 1). Instead, model training may be executed after data processing is completed.

In some embodiments, in executing workflow 200, the system may validate the connections in the workflow by determining whether the data types between two components of a connection match. In response to determining a match, the system may validate the connection. For example, the system may check the validity of connection 210 by determining whether data type associated with the output data port of component 202 matches the data type associated with the input data port of component 204. In the example shown, the output data port of component 202 and the input data port of component 204 are both associated with the same data type (i.e., data type 2), thus, the system may determine that connection 210 is valid.

With further reference to FIG. 2A, the system may determine context boundaries between different contexts based on the machine learning workflow specification (e.g., by parsing or otherwise examining data within the specification). As described above, determining the context boundaries may allow the system to properly manage the transfer of data between different contexts because different contexts may be executed by different processor(s), different computing platforms, and in synchronously or asynchronously manners. In some embodiments, the system may determine a context boundary by determining whether a connection is defined to connect two components associated with different contexts. In response to determining that a connection connects two components associated with different contexts, the system may determine a context boundary. For example, connection 212 connects component 202 (associated with Context 1) and component 208 (associated with Context 2). In such case, in response to determining that connection 212 connects two components associated with different contexts, the system may determine a context boundary between Context 1 and Context 2.

In some embodiments, a component may be associated with a context boundary when the component of a given context has the input data port and/or the output data port connecting to another component associated with a different context. For example, component 202 may be associated with a context boundary because the output data port of component 202 (associated with Context 1) is connected to component 208 (associated with Context 2). In such case, the output data port of component 202 may share data with the input data port of component 208 through a shared memory, as described above. This allows flexibility in the system in that any context can be executed in any computing environment at any site and be able to share data with another context.

According to some embodiments, connections across context boundaries may be identified by the system as points in the workflow in which data produced by a component in a context should be recorded to shared storage. As discussed above, since components in different contexts may be executed by different computing resources, data between contexts may need to be passed between these resources, such as by being written to a storage location that each computing resource to be used can access.

Figure 3:
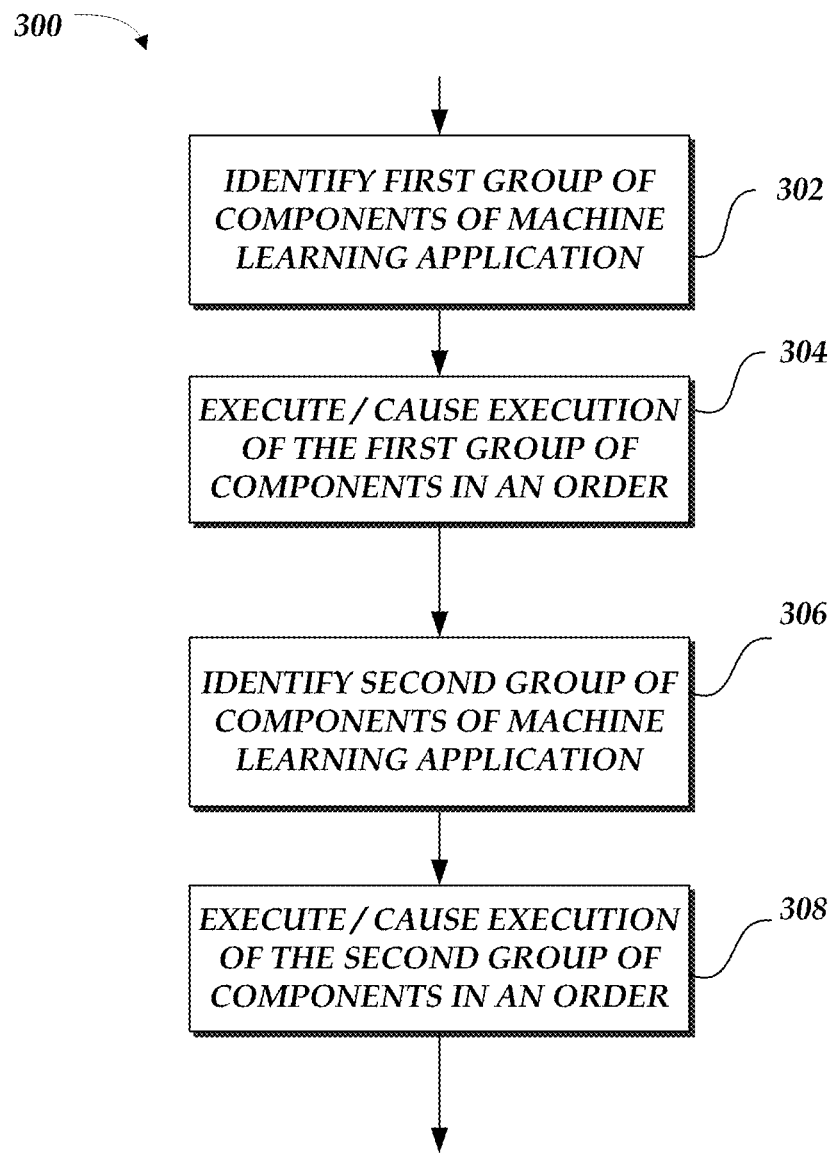
FIG. 3 is a flowchart of a method of executing a machine learning workflow, according to some embodiments.

FIG. 3 is a flowchart of a method of executing a machine learning workflow, according to some embodiments. Method 300 may be performed by one or more suitable components in machine learning workflow system 100 shown in FIG. 1A, such as AI/ML workflow management system 104 and/or orchestrator 106. Illustrative method 300 includes identifying a first group of one or more components of a machine learning workflow as being associated with a first context, based on a machine learning workflow specification that represents the machine learning workflow at act 302; executing, or causing execution of, the one or more components of the first group in an order according to one or more connections between the one or more components of the first group as defined by the machine learning workflow specification, at act 304; identifying a second group of one or more components of the machine learning workflow as being associated with a second context, based on the machine learning workflow specification, at act 306; and executing, or causing execution of, the one or more components of the second group in an order according to one or more connections among the one or more components of the second group as defined by the machine learning workflow specification, at act 308.

In some embodiments, these acts 302, 304, 306 and 308 may be performed using any of the techniques described above with reference to FIGS. 1A, 1B, 1C, 2A and 2B. For example, prior to method 300 the components and connections in a machine learning workflow may be defined by the user via a customer portal (e.g., 102 of FIG. 1A), and the machine learning workflow specification may be generated by the AI/ML workflow management system (e.g., 104 of FIG. 1A) based on the user defined workflow. Subsequently, acts 302, 306 may be performed by the AI/ML workflow management system (e.g., 104 of FIG. 1) based on the context associated with each of the components in the first group of the components in the workflow. In some embodiments, user input provided to the customer portal may initiate execution of the workflow and thereby trigger initiation of method 300, which may be performed as part of the execution. Acts 304 and 308 may also be performed by the orchestrator (e.g., 106 of FIG. 1A, 150 of FIG. 1B, 180 of FIG. 1C) based on the context associated with each of the components in the second group of the components in the workflow.

In some embodiments, acts 304 and 308 may be performed using computing resources (e.g., by processors of different speed and/or capacities) and/or in different computing environments (e.g., using local or remote servers to system 100), and in a synchronous or asynchronous manner. In some examples, each of acts 304 and 308 may correspond to any of the contexts shown in FIG. 2B in deploying a machine learning application. Thus, acts 304 and 308 may be performed in sequence in the order as they are listed in FIG. 2B.

Figure 4:
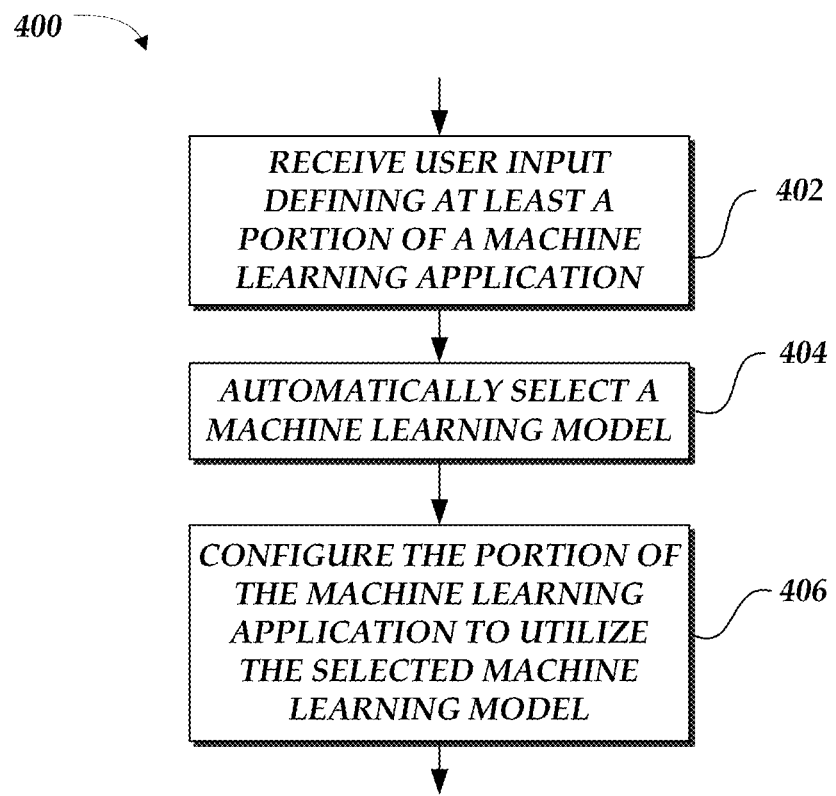
FIG. 4 is a flowchart of a method of automatically selecting a machine learning model, according to some embodiments.

FIG. 4 is a flowchart of a method of automatically selecting a machine learning model, according to some embodiments. As discussed above, in some embodiments the system may identify one or more machine learning models (e.g., based on matching the data type associated with the machine learning models to user's data), and automatically select a suitable machine learning model. Method 400 may be performed by a suitable component in the machine learning workflow system (e.g., 100 of FIG. 1A, such as AI/ML workflow management system 104 and/or orchestrator 106). The illustrative method 400 includes receiving user input defining at least a portion of a machine learning application, at act 402; automatically selecting a machine learning model for the machine learning application, at act 404; and configuring the machine learning application to utilize the selected machine model, at act 406.

In the example of FIG. 4, in act 402 user input defining a portion of the machine learning application may be received from the customer portal (e.g., 102 of FIG. 1A). In some embodiments, the portion of the machine learning application may be a portion of a corresponding workflow, which may include one or more components associated with a given context (such as those shown in FIG. 2B).

In the example of FIG. 4, in act 404 a machine learning model is automatically selected. Act 404 may be performed by a suitable component of the system, such as AI/ML workflow management system (e.g., 104 of FIG. 1A) and/or orchestrator (e.g., 106 of FIG. 1A, 150 of FIG. 1B, 180 of FIG. 1C). Act 404 may include identifying one or more machine learning models and automatically selecting a machine learning model from among the identified machine learning models. As described above, identifying the one or more machine learning models may be performed based on matching a data type associated with the machine learning models and the data type as input to a component of the portion of the workflow. For example, a facial recognition model may be associated with images. In this case, the system may identify one or more machine learning models capable of processing images.

According to some embodiments, the data type examined in act 404 to identify a machine learning model may, for instance, be the data type of an input port of a component that utilizes a machine learning model (e.g., a training component). Performing act 404 by the system performing method 400 may be triggered in some embodiments by user input indicating a component that utilizes a machine learning model is to be added to a workflow, or by user input requesting that the system automatically suggest or select a suitable model for such a component.

In automatically selecting the machine learning model for the machine learning application in act 404, the system performing method 400 may compare the performance of a plurality of identified machine learning models. For each of the one or more machine learning models associated with the data type, the method may generate a respective metric value indicating a performance of the machine learning model over the input data; and select a machine learning model from among the one or more machine learning models by comparing the metric values generated for the one or more machine learning models.

According to some embodiments, one or more performance metrics may be determined based on data to be evaluated that is identified by the current workflow. The data to be evaluated may include input data identified by an input data component (e.g., a source of stored data) and/or may include data provided as input to the component that utilizes a machine learning model for which the model is to be selected. In the latter case, the system performing method 400 may execute some portion of the workflow to produce the data to be evaluated, since this data may not exist until earlier portions of the workflow have been executed. For instance, consider a workflow that includes a data preprocessing context following by a training context that includes the component for which a model is to be selected. The data preprocessing context may first be executed as part of act 404 to produce the data to be evaluated since this data is to be input into the training context. In some embodiments, the data to be evaluated may comprise a sample of the full available data to reduce the processing time necessary to evaluate the data. For instance, if data to be evaluated includes a large number of data records, a sample (e.g., first 100, last 100, random selection of 100, etc.) of records may be used as input to the various performance metrics.

In some embodiments, various performance metrics may be performed to in act 404, depending on the machine learning models being evaluated. Each of the different performance metrics may be performed on the same data to be evaluated. To select the metric, the metrics may be identified as being associated with a data type, and/or as being associated with a class of machine learning models. For example, if a machine learning model is classed as a regression model, the performance metrics for evaluating the regression model may include mean square error (MSE), root mean squared error (RMS), absolute mean error (AME), R-squared ($R^2$), and/or a combination thereof. These metrics may be expressed, for data points $y_i$, as:

$$MSE = \frac{1}{n}\sum_{i=1}^{n}(y_i - \hat{y}_i)^2$$

$$RMS = \sqrt{\frac{\sum_{i=1}^{n}(y_i - \hat{y}_i)^2}{n}}$$

$$AME = \frac{1}{n}\sum_{i=1}^{n}|y_i - \hat{y}_i|$$

$$R^2 = 1 - \frac{\sum_{i=1}^{n}(y_i - \hat{y}_i)^2}{\sum_{i=1}^{n}(y_i - \bar{y})^2}$$

Alternatively, if the data type is image data and/or if the machine learning model class is identified to be an image model, other performance metrics may be evaluated as relating to the performance of different image models on the same image data. For example, for a classification model, the performance metrics for evaluating the classification model may include a true positive, a false positive, a false negative, a true negative, an accuracy rate, a precision rate, a recall rate, a F1 score, or a combination thereof.

Figure 7:
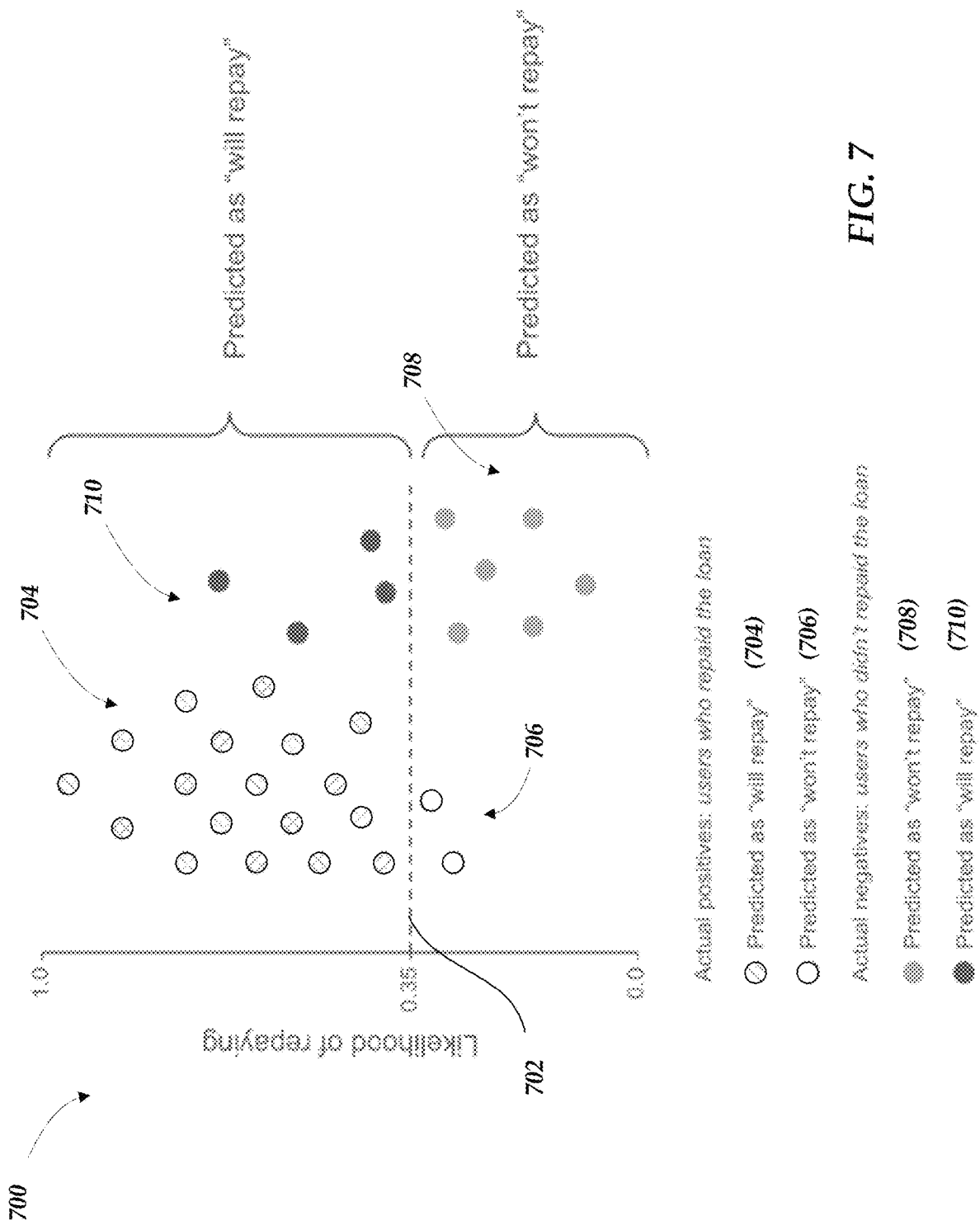
FIGS. 7-10 depict illustrative examples of receiver operating characteristics for machine learning model evaluation, according to some embodiments.

To illustrate an example of evaluating a machine learning model using one performance metric, FIGS. 7-10 show examples of determining receiver operating characteristics (ROC) for classification. In the illustrated example, the machine learning model predicts whether a loan will be repaid based on a threshold of predicted probabilities. As shown in the example of FIG. 7, a threshold (702) is selected at 0.35 for the data to be evaluated, and all predictions at or above the threshold are classified as "will pay," and all predictions below the threshold are classified as "won't pay." Distribution chart 700 shown in FIG. 7 shows the distributions of true positives (704), false positives (710), false negatives (706), and true negatives (708) when applying the threshold.

Figure 8:
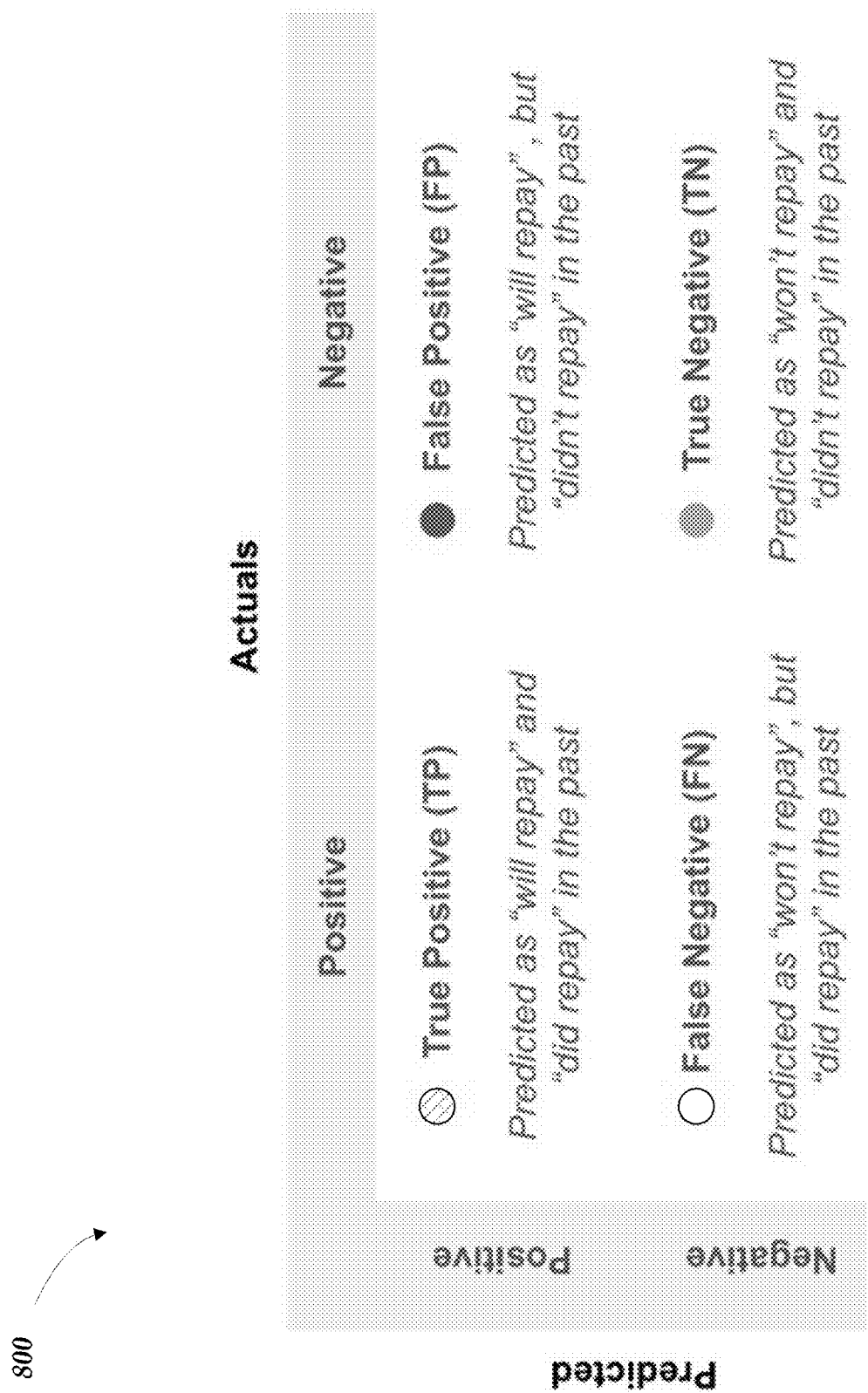

FIG. 8 shows a confusion matrix at a given threshold for the same data to be evaluated. For example, the matrix may include the values of the true positives (TP), false positives (FP), true negatives (TN), and false negatives (FN) after applying the threshold in FIG. 7, in some examples.

Figure 9:
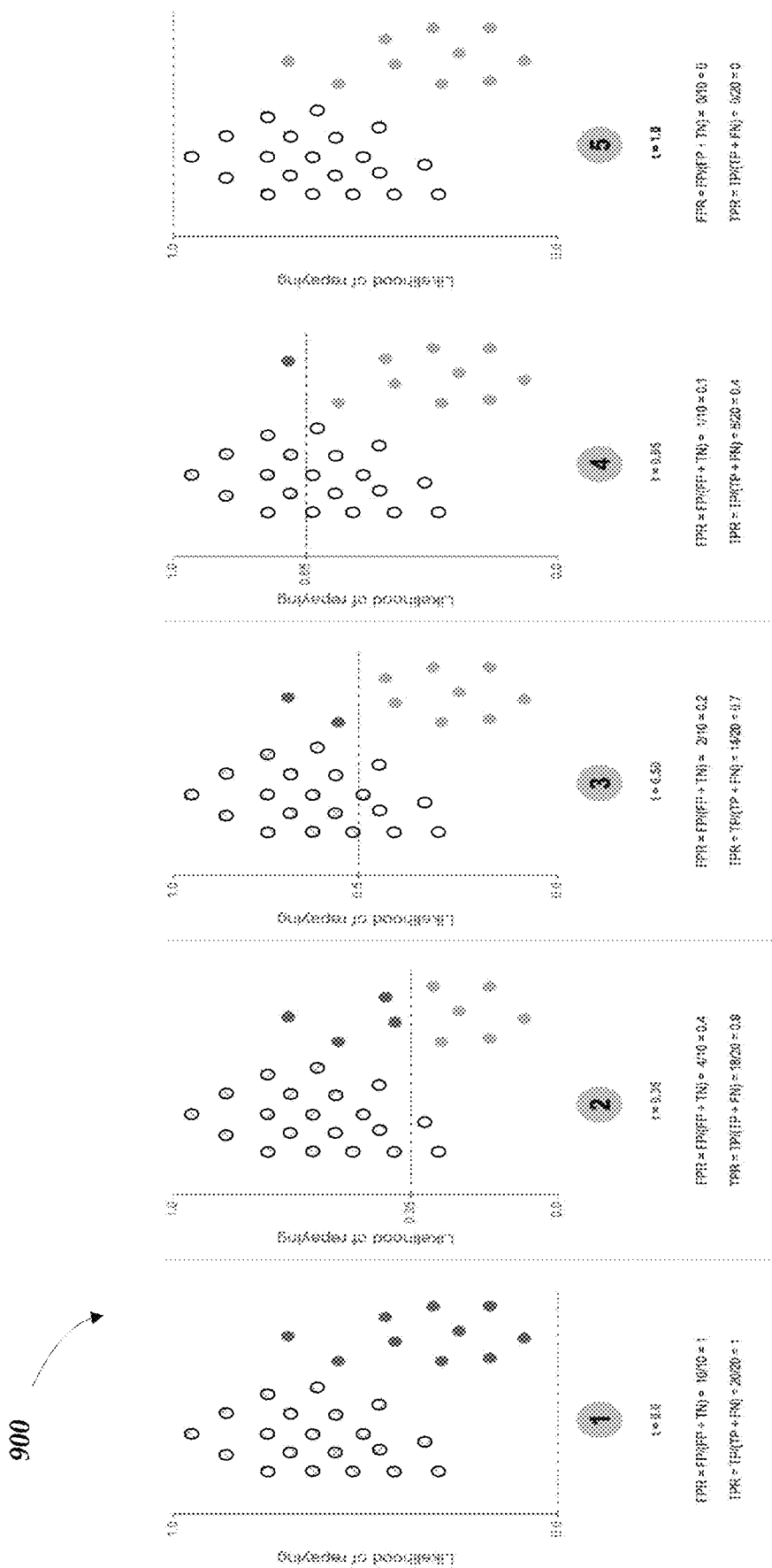

FIG. 9 shows the false positive rate (FPR) and true positive rate (TPR) values for various prediction thresholds for the data to be evaluated. In some examples, FPR and TPR may be expressed as:

FPR=FP/(FP+TN)

TPR=TP/(TP+FN)

Figure 10:
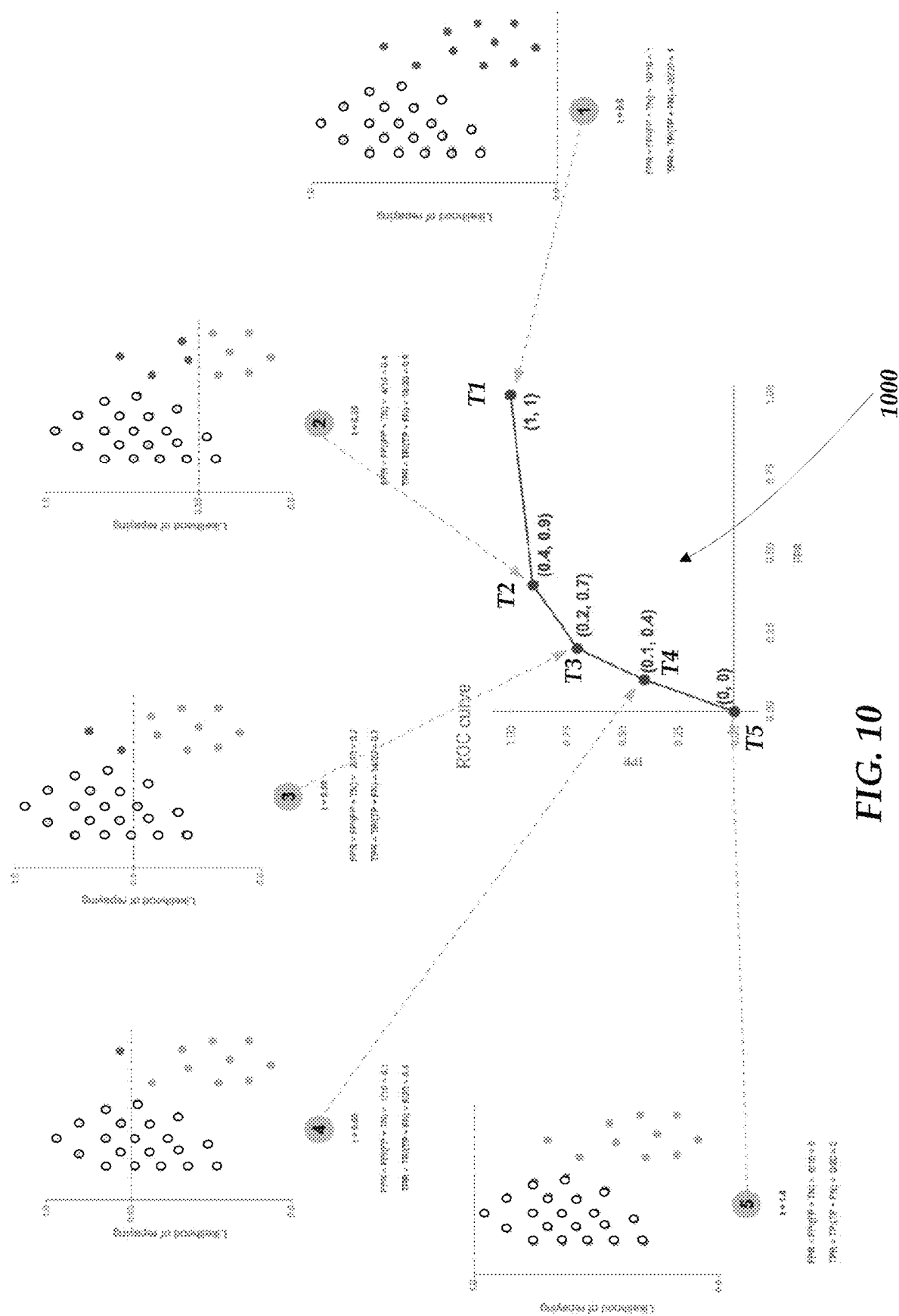

FIG. 10 shows an example ROC curve 1000 that shows the FPR/TPR values (respectively at FPR and TPR axis) at different thresholds, such as at T1, T2, T3, T4, and T5 for the data to be evaluated. Although specific examples of ROC curve are shown, it is appreciated that other performance metrics or variations of ROC may be possible.

Irrespective of the particular performance metrics that are determined, in act 404 the system performing method 400 may select from the different machine learning models identified based on the determined metrics. Various performance metrics described above or other metrics may be used to select the machine learning model. For example, for a regression application, the system may select the model that has the lowest error among the different machine learning models. For a classification application, the system may use the ROC curve to select the machine learning model. For example, the points closest to the upper left corner of the ROC curve (indicating high true positive and low false positive) may indicate the best performance, and thus, a threshold that may be used may be selected based on the ROC curve.

In other scenarios, the system may use F1 score and select the machine learning model that has the best F1 score among the different machine learning models. Alternatively, and/or additionally, the system may allow the user to select a performance metric. For example, the user may select precision and recall metrics. Accordingly, the system may sort the different machine learning models by the precision and/or recall metrics as described above, and select the machine model that has the best combination. The various performance metrics may be used depending on the application. For example, for a cancer detection application, the system may use false positives (as opposed to using false negatives), or apply more weights to false positives than false negatives. This prevents the system from missing any early diagnosis.

Returning to FIG. 4, once a machine learning model is selected in act 404, the system performing method 400 may configure the portion of the machine learning application (e.g., received from act 402) to include the selected machine learning model. In a non-limiting example, the portion of the machine learning application may include an inference context, thus, configuration the portion of the machine learning application may include configuring at least a component of the machine learning application (e.g., the inference engine) to utilize the selected machine learning model.

Figure 5:
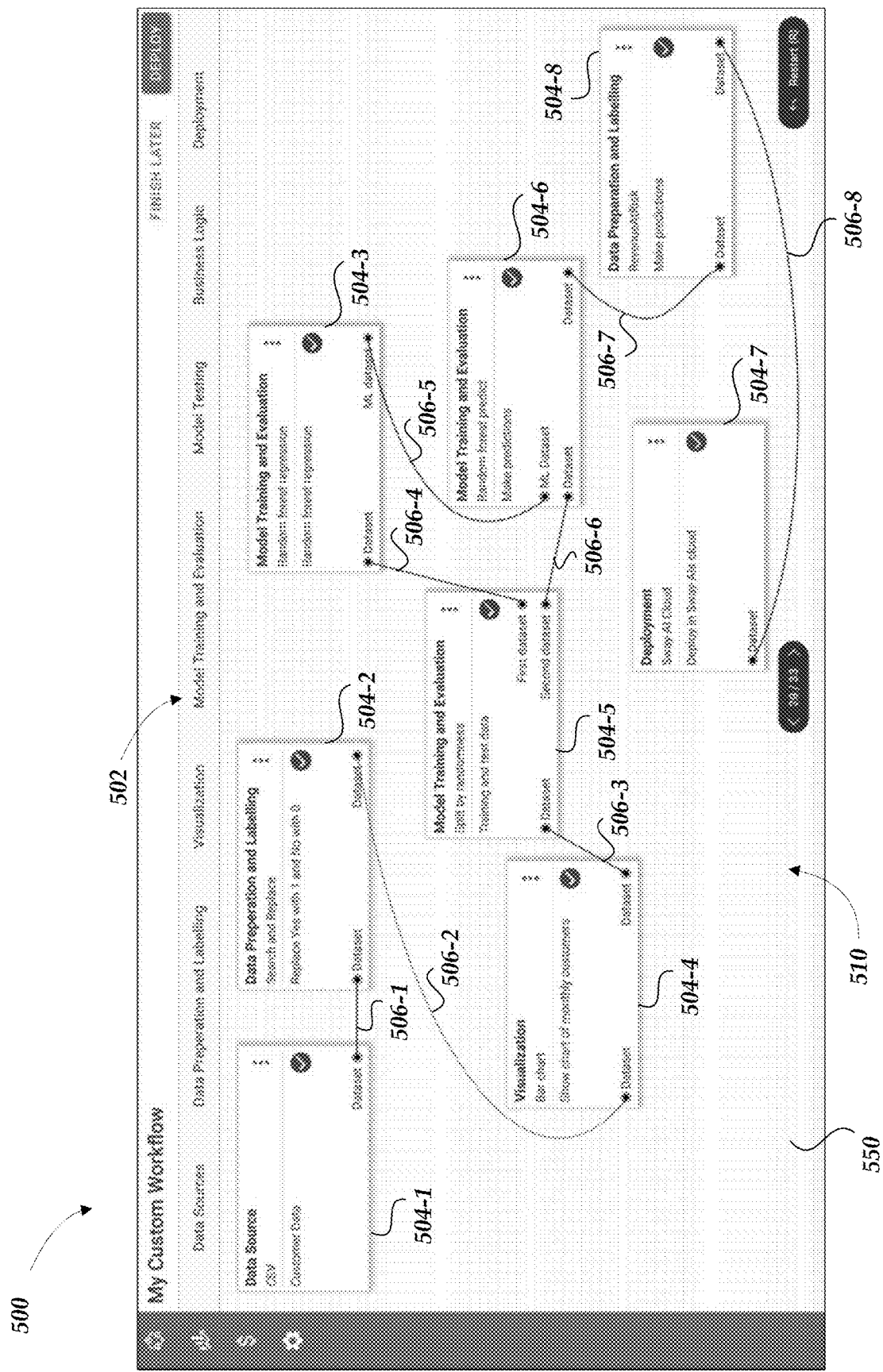
FIG. 5 illustrates a portion of a graphical user interface that may be implemented to configure at least a portion of a machine learning workflow system, according to some embodiments.

FIG. 5 illustrates a portion of a graphical user interface 500 that may be implemented to configure at least a portion of a machine learning workflow system, according to some embodiments. The graphical user interface 500 may be implemented by the customer portal 102 shown in FIG. 1A and may be configured to allow a user to define a machine learning workflow as discussed above. As shown in FIG. 5, workflow 510 may be defined using a visual graph on a canvas 550. The visual graph may include nodes 504 and edges 506, where the nodes may represent components in a workflow and edges may represent connections between the components. In the workflow 510, each component 504 may correspond to an operation to be executed in the workflow. For example, component 504-1 includes a data source operation that, when executed, imports custom data, such as a comma separated value (CSV) file.

With further reference to FIG. 5, user interface 500 may allow the user to select multiple components of a machine learning application from a template to place the components on the canvas 550. User interface 500 may also allow the user to define one or more connections between the multiple selected components. In some embodiments, the template may include multiple drop-down menus (e.g., 502) each representing a respective category of operations. For example, the categories for operations may include any of the following categories: data sources, data preparation and labeling, visualization, model training and evaluation, model testing, business logic, and/or deployment. Each category may include multiple components for the user to select. For example, machine training and evaluation category may include multiple components, such as "split by randomness," "random forest regression," and/or "random forest prediction."

In some embodiments, each component in the workflow may include one or more input data ports and/or one or more output data ports. Thus, each connection between components defines a flow of data from an output data port of one component to an input data port of another component. In some embodiments, the input data port(s) and output data port(s) of each component may each be associated with a data type. For example, a data type may include text, numerical data, video, image, audio, time series data, or other suitable data types. In some embodiments, each component may have properties, such as the input data port(s), output data port(s), and/or the data type associated with each port. The graphical user interface 500 may display the user selected component(s) along with the properties for each of the components.

In some embodiments, available components (e.g., as defined by the template) may have a data schema that allows the component to be displayed with associated properties. For example, a component for training data with a machine learning model may include an input data port and an output data port as defined by the schema. A component may also include a widget such as a form or a text input box for receiving user input. In such example, when a component is selected, the user may be prompted to enter value(s) of one or more parameters associated with the selected component.

In an example in which the selected component represents a training operation, the parameters may include user entered training parameters. As described, the parameters associated with user selected components may be saved by the AI/ML workflow management system (e.g., 104 of FIG. 1A) and passed from the AI/ML workflow management system to the orchestrator (e.g., 106 of FIG. 1A) during execution of the workflow. It is appreciated that other widgets may be used. Examples of other widgets may include email tool (for business logics), SMS/phone alerting tools, customer relationship management (CRM) tools, electronic medical records (EMR) tools, sliders to specify a threshold value, column selection lists to choose columns to keep/drop, drop down menu to select deploying model locally, at edge or in a cloud etc.

In some embodiments, the graphical user interface provided by the customer portal 102 may be configured to validate each connection while the user is about to make and determine whether a valid connection is being made. Validation may be performed by determining that a data type of the output data port of one component of a connection matches a data type of the input data port of the other component of the connection. In response to determining a match of the data types, the system may determine that the connection is valid; otherwise, the system may determine that the connection is invalid. When the user is making an invalid connection, the system may display an alert indicating that the user attempted to make an invalid connection. In some embodiments, the system may also validate a connection after the user has already defined, for example, when generating the machine learning workflow specification as described above.

Figure 6:
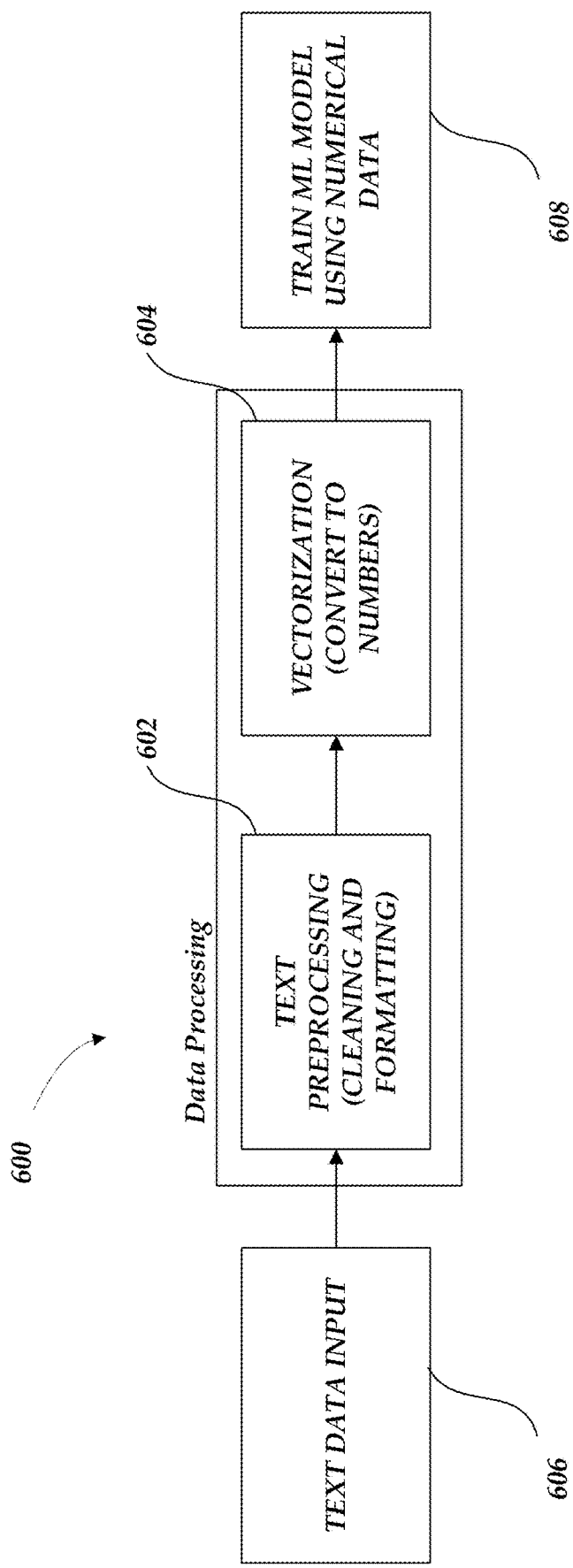
FIG. 6 illustrates a portion of a machine learning workflow system including data processing, according to some embodiments.

In some embodiments, one or more components may be provided by the system to convert different data types. FIG. 6 illustrates a portion of a machine learning workflow system 600 including data processing, according to some embodiments. In this example, components 602 and 604 are associated with a data processing context, where component 602 may be configured to perform text preprocessing by cleaning the text and formatting the text data, and component 604 may perform vectorization operation to convert the preprocessed text data into numerical data. In this example, a valid connection may be allowed between a component associated with text data input 606 and text preprocessing component 602, or between vectorization component 604 and ML training component 608. However, no valid connection may be made between components 606 and 608 because the component 608 requires numerical data be provided as input, and the component 606 outputs text data.

Returning to FIG. 5, a data processing component included in the workflow may be configured to split data defined by a data source into a first portion and a second portion, where the first portion may be used by a second component and the second portion may be used by a third component. Splitting up data may be performed randomly in some embodiments, wherein the component splitting the data may be configured to output certain fractions of the available data to various output ports. For instance, a component may be configured to output 70% of the data to a training component, and to output 30% of the data to a testing component. With respect to the example of FIG. 5, for instance, component 504-5 may be configured to split the data provided by component 504-4 into two portions: a first dataset and a second dataset for use with training and testing, respectively. As such, a first output data port of component 504-5 may be connected to random forest regression model training and evaluation (component 504-3) by connection 506-4 to provide the first dataset to component 504-3. A second output data port of component 504-5 may be connected to random forest prediction model training and evaluation (component 504-6) by connection 506-6 to provide the second dataset to component 504-6. As shown in FIG. 5, component 504-6 may comprise another input data port to receive data from the random forest regression model training and evaluation (component 504-3) via connection 506-5. Although a graphical user interface 500 is shown, it is appreciated that other techniques may be possible for the user to define a machine learning workflow. For example, the user may use a script file, a schema editor, or other tools to define a workflow.

Figure 11:
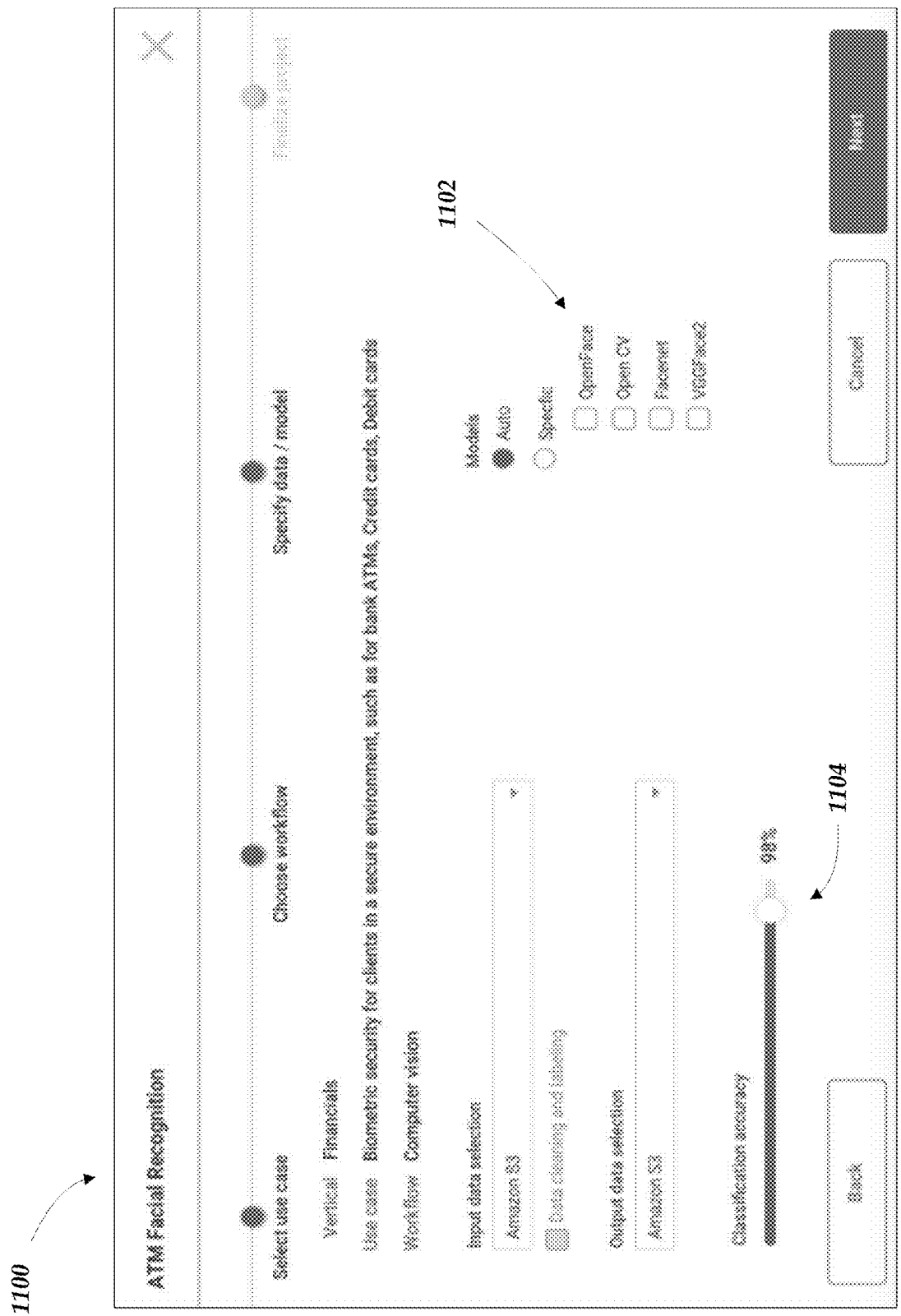
FIGS. 11-12 depict portions of a user interface that may be implemented to configure at least a portion of a machine learning workflow system for deploying a facial recognition application, according to some embodiments.
Figure 12:
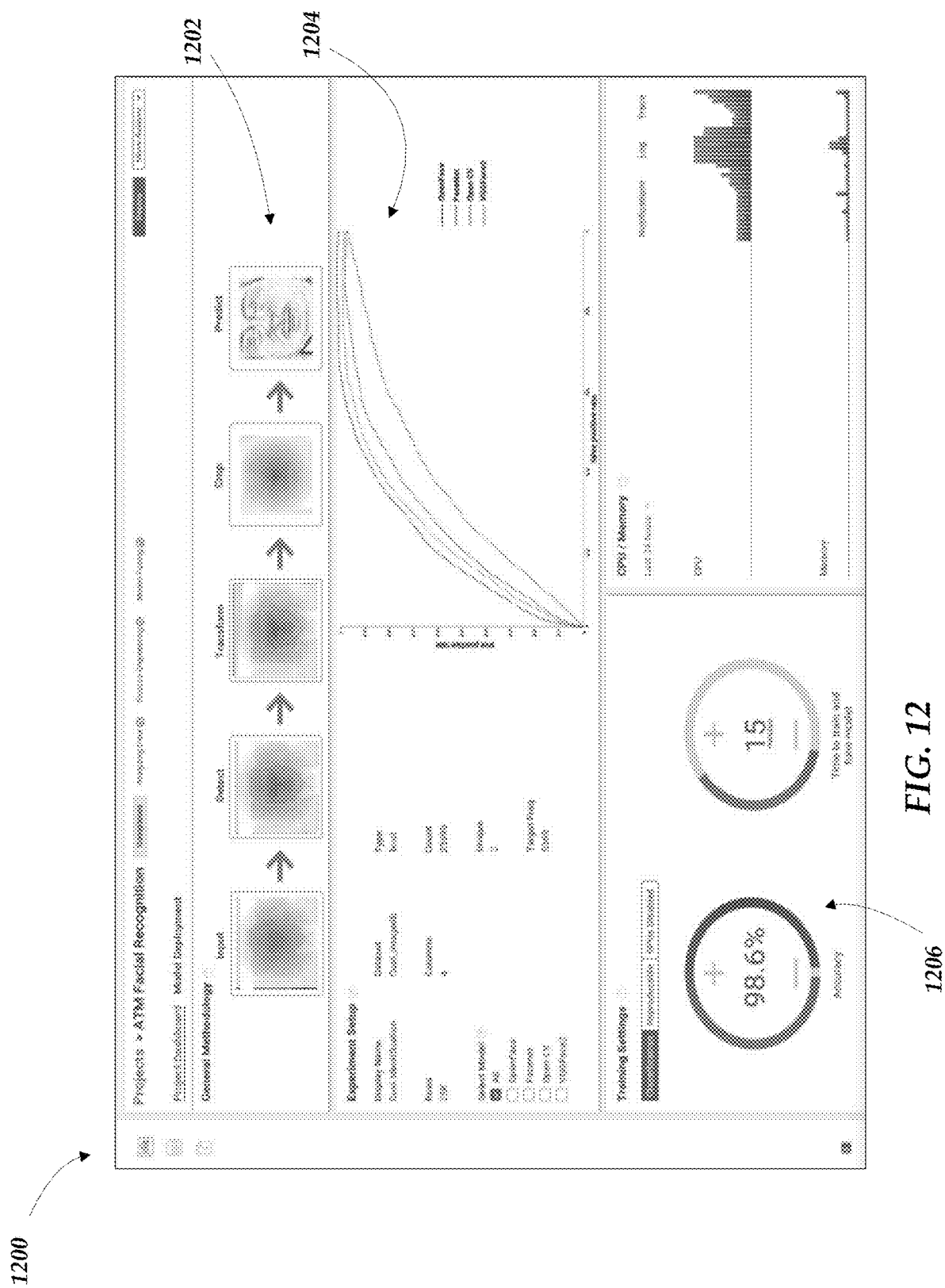

The various techniques described herein may be used to deploy a variety of machine learning applications in various fields. FIGS. 11-12 depict portions of a user interface that may be implemented to configure at least a portion of a machine learning workflow system for deploying a facial recognition application, according to some embodiments. The portions of the user interface shown in FIGS. 11-12 may be implemented by the machine learning workflow system (e.g., 100 of FIG. 1A, such as customer portal 102).

In the example of FIG. 11, user interface 1100 may allow the user to define a workflow for a facial recognition application. As shown, the template 1100 may include a widget 1102 that may allow the user to select a specific machine learning model or opt to automatically selecting a machine learning model by the system. In the example shown, the system may have a plurality of machine learning models suitable for facial recognition e.g., OpenFace, Open CV, Facenet, and VGGFace2. As further shown in FIG. 11, the user interface 1100 may allow the user to enter one or more parameters associated with selecting the machine learning model. For example, the user interface may include a widget 1104 (e.g., a slider bar) to allow the user to define an accuracy threshold for evaluating the machine learning model. Other widgets may be used to allow the user to define the accuracy threshold.

Whereas only a selected category of machine learning models for facial recognition are shown in FIG. 11, it is appreciated that the system may be configured to allow the user to select any other machine learning models to suit different machine learning applications. For example, the system may include a plurality of machine learning model categories for automatic selection, such as automated anomaly detection, regression models, and sentiment analysis. Each of the categories may include multiple models for selection. For example, regression models may include multiple regression models for selection, such as stochastic gradient descent, random forest, ridge regression and other models. In some embodiments, each category of machine learning models may be associated with a data type. For example, the automated anomaly detection models may be suitable for input image data. Regression models may be suitable for input numerical data. Sentiment analysis models may be suitable for input text data.

With reference to FIG. 12, user interface 1200 shows a portion of the graphics user interface that include multiple portions to display various results generated from the execution of the workflow defined by the user. For example, area 1202 may be configured to display intermediate images while the machine learning workflow is being implemented. Area 1204 may be configured to display a comparison of performance metric values for multiple machine learning models to be selected. As shown in areas 1204, ROC curves for four machine learning models for facial recognition are displayed and compared. User interface 1200 may also include area 1206 configured to display the accuracy of the machine learning models being evaluated.

Figure 13:
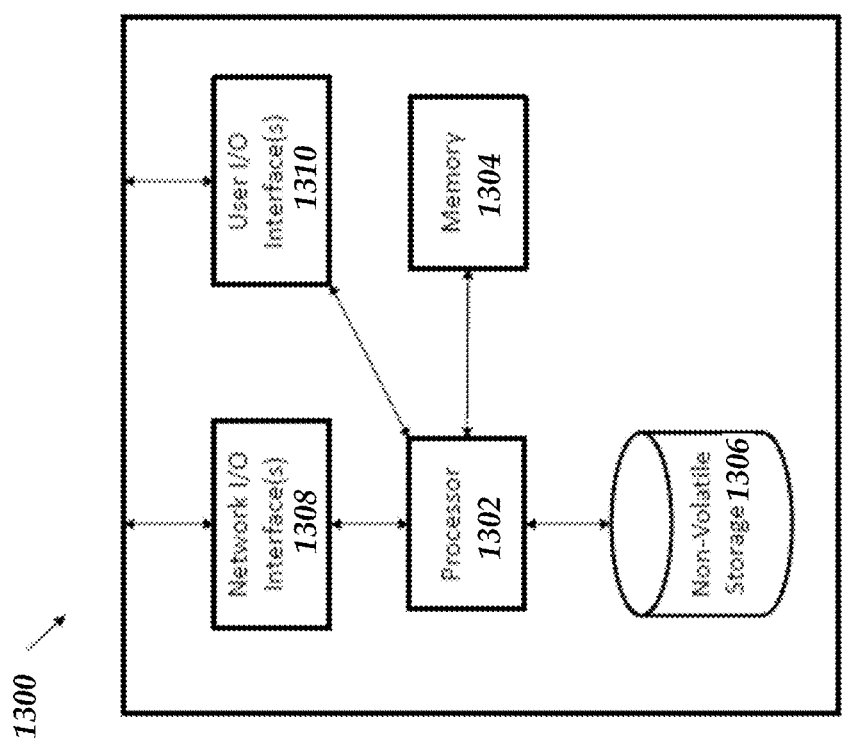
FIG. 13 illustrates an example of a computing system environment on which aspects of the invention may be implemented.

FIG. 13 shows an illustrative implementation of a computer system that may be used to perform any of the aspects of the techniques and embodiments disclosed herein, according to some embodiments. For example, the computer system 1300 may implement some or all of machine learning workflow system 100 of FIG. 1A, including customer portal 102, AI/ML workflow management system 104, and/or one or more orchestrators 106. The computer system 1300 may be configured to perform any of the various methods and acts as described above. The computer system 1300 may include one or more processors 1302 and one or more non-transitory computer-readable storage media (e.g., memory 1304 and one or more non-volatile storage media 1306) and a display 1310. The processor 1302 may control writing data to and reading data from the memory 1304 and the non-volatile storage device 1306 in any suitable manner, as the aspects of the invention described herein are not limited in this respect. To perform functionality and/or techniques described herein, the processor 1302 may execute one or more instructions stored in one or more computer-readable storage media (e.g., the memory 1304, storage media 1306, etc.), which may serve as non-transitory computer-readable storage media storing instructions for execution by the processor 1302.

In connection with techniques described herein, code used to, for example, detect anomalies in images/videos may be stored on one or more computer-readable storage media of computer system 1300. Processor 1302 may execute any such code to provide any techniques for detecting anomalies as described herein. Any other software, programs or instructions described herein may also be stored and executed by computer system 1300. It will be appreciated that computer code may be applied to any aspects of methods and techniques described herein. For example, computer code may be applied to interact with an operating system to detect anomalies through conventional operating system processes.

The various methods or processes outlined herein may be coded as software that is executable on one or more processors that employ any one of a variety of operating systems or platforms. Additionally, such software may be written using any of numerous suitable programming languages and/or programming or scripting tools, and also may be compiled as executable machine language code or intermediate code that is executed on a virtual machine or a suitable framework.

In this respect, various inventive concepts may be embodied as at least one non-transitory computer readable storage medium (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, implement the various embodiments of the present invention. The non-transitory computer-readable medium or media may be transportable, such that the program or programs stored thereon may be loaded onto any computer resource to implement various aspects of the present invention as discussed above.

The various techniques described above in relation to FIGS. 1-13 may provide advantages over conventional systems in that various operations in deploying a machine learning application may be streamlined in a workflow management system without requiring users to have in-depth knowledge of machine learning models or programming skills. In addition, the computing resources required of various operations in deploying a machine learning application may be optimized depending on the workflow contexts so that the deployment of a machine learning application can be executed efficiently.

Furthermore, the machine learning workflow system as described above may dynamically load resources, such as libraries, only when needed for a give context. This allows the system itself to be self-contained with little dependencies. For example, the system or a portion of a system (e.g., AI/ML workflow management system) may be embedded within the software of various different systems, within data processing map/reduce clusters, within machine learning training components or within the machine learning models themselves. These advantages also make the system have a minimal footprint and maintain compatibility with many software packages.

The techniques described above are sometimes explained with reference to machine learning. However, the terms "machine learning" and "artificial intelligence" may be considered interchangeable and the above description is not limited to technology that might be described using either term. A machine learning model or an AI model may generally refer to any framework or architecture that has trainable parameters/weights, and may not be limited to any specific machine learning model or particular field.

The terms "program," "software," and/or "application" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion among different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in non-transitory computer-readable storage media in any suitable form. Data structures may have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Various inventive concepts may be embodied as one or more methods, of which examples have been provided. The acts performed as part of a method may be ordered in any suitable way. Accordingly, embodiments may be constructed in which acts are performed in an order different than illustrated, which may include performing some acts simultaneously, even though shown as sequential acts in illustrative embodiments.

The indefinite articles "a" and "an," as used herein in the specification and in the claims, unless clearly indicated to the contrary, should be understood to mean "at least one." As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This allows elements to optionally be present other than the elements specifically identified within the list of elements to which the phrase "at least one" refers, whether related or unrelated to those elements specifically identified.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting.

What is claimed is:

1. A method of operating a data processing system configured to deploy one or more machine learning applications, each machine learning application configured to process input data using a respective machine learning model to generate output data, the method comprising, by one or more processors:
   receiving user input defining at least a portion of a first machine learning application, the portion of the first machine learning application comprising a first component, the first component defining a first data type as input to the first component and identifying input data having the first data type;
   automatically selecting a machine learning model for the first machine learning application by:
      identifying one or more machine learning models each associated with the first data type;
      for each of the one or more machine learning models associated with the first data type, generating a respective metric value indicating a performance of the machine learning model over at least a first portion of the input data having the first data type; and
      selecting a machine learning model from among the one or more machine learning models by comparing metric values generated for each of the one or more machine learning models; and
   configuring the first component of the first machine learning application so that the first component is configured to utilize the selected machine learning model.

2. The method of claim 1, further comprising:
   executing the first machine learning application to perform a machine learning task using the selected machine learning model.

3. The method of claim 1, wherein automatically selecting the machine learning model comprises, for each of the one or more machine learning models:
   additionally training a respective one of the one or more machine learning models using at least a second portion of the input data,
   wherein generating the respective metric value indicating the performance of the machine learning model is performed using the respective trained machine learning model.

4. The method of claim 1, wherein automatically selecting the machine learning model is performed according to a machine learning workflow specification.

5. The method of claim 4, further comprising:
   receiving first user selections of one or more components of the first machine learning application;
   receiving second user selections of one or more connections among the one or more components; and
   generating the machine learning workflow specification based on the received first and second user selections.

6. The method of claim 5, further comprising:
   displaying a plurality of user selectable categories of components of a machine learning application, each user selectable category of components comprising one or more components each comprising an input data port and an output data port;
   wherein receiving the first user selections comprises receiving the first user selections from a respective user selectable category of the plurality of user selectable categories of components in response to displaying the plurality of user selectable categories.

7. The method of claim 6, wherein each of the one or more connections in the second user selections defines a flow of data from an output data port of a first component of the one or more components in the first user selections to an input data port of a second component of the one or more components in the first user selections.

8. The method of claim 7, further comprising:
   validating each of the one or more connections in the second user selections by determining that a data type of the output data port of the first component of a respective connection matches a data type of the input data port of the second component of the respective connection.

9. The method of claim 6, further comprising:
   displaying representations of the one or more components in the first user selections, wherein a representation of a component of the one or more components defines a user input area for obtaining one or more property values for the component; and
   receiving, via the user input area of the representation of the component, one or more property values for the component.

10. The method of claim 1, wherein the first component of the first machine learning application, when executed, performs an operation selected from a list of operations comprising: data ingestion, data preparation, data labeling; machine learning model training, machine learning model evaluation, machine learning inference, business logic, and machine learning model deployment.

11. A system comprising:
   one or more processors configured to execute programming instructions to perform operations to deploy one or more machine learning applications, each machine learning application configured to process input data using a respective machine learning model to generate output data, the method comprising, the operations comprising:
      receiving user input defining at least a portion of a first machine learning application, the portion of the first machine learning application comprising a first component, the first component defining a first data type as input to the first component and identifying input data having the first data type;
      automatically selecting a machine learning model for the first machine learning application by:
         identifying one or more machine learning models each associated with the first data type;
         for each of the one or more machine learning models associated with the first data type, generating a respective metric value indicating a performance of the machine learning model over at least a first portion of the input data having the first data type; and
         selecting a machine learning model from among the one or more machine learning models by comparing metric values generated for each of the one or more machine learning models; and
      configuring the first component of the first machine learning application so that the first component is configured to utilize the selected machine learning model.

12. The system of claim 11, wherein automatically selecting the machine learning model comprises, for each of the one or more machine learning models:
   additionally training a respective one of the one or more machine learning models using at least a second portion of the input data, wherein generating the respective metric value indicating the performance of the machine learning model is performed using the respective trained machine learning model.

13. The system of claim 11, wherein automatically selecting the machine learning model is performed according to a machine learning workflow specification.

14. The system of claim 13, further comprising a graphical user interface, wherein the operations further comprise:
causing the graphical user interface to:
display a plurality of user selectable categories of components of a machine learning application, each user selectable category of components comprising one or more components each comprising an input data port and an output data port;
receive first user selections of one or more components of the first machine learning application from a respective user selectable category of the plurality of user selectable categories of components in response to displaying the plurality of user selectable categories; and
receive second user selections of one or more connections among the one or more components, wherein each of the second user selections defines a flow of data from an output data port of a first component of the one or more components in the first user selections to an input data port of a second component of the one or more components in the first user selections; and
generating the machine learning workflow specification based on the received first and second user selections.

15. The system of claim 14, wherein the operations further comprise:
validating each of the one or more connections in the second user selections by determining that a data type of the output data port of the first component of a respective connection matches a data type of the input data port of the second component of the respective connection.

16. The system of claim 14, wherein the operations further comprise causing the graphical user interface to:
display representations of the one or more components in the first user selections, wherein a representation of a component of the one or more components defines a user input area for obtaining one or more property values for the component; and
receive, via the user input area of the representation of the component, one or more property values for the component.

17. At least one non-transitory computer-readable medium comprising instructions that, when executed by one or more processors on a computing device, are operable to cause the one or more processors to perform operations to deploy one or more machine learning applications, each machine learning application configured to process input data using a respective machine learning model to generate output data, the operations comprising:
receiving user input defining at least a portion of a first machine learning application, the portion of the first machine learning application comprising a first component, the first component defining a first data type as input to the first component and identifying input data having the first data type;
automatically selecting a machine learning model for the first machine learning application by:
identifying one or more machine learning models each associated with the first data type;
for each of the one or more machine learning models associated with the first data type, generating a respective metric value indicating a performance of the machine learning model over at least a first portion of the input data having the first data type; and
selecting a machine learning model from among the one or more machine learning models by comparing metric values generated for each of the one or more machine learning models; and
configuring the first component of the first machine learning application so that the first component is configured to utilize the selected machine learning model.

18. The at least one non-transitory computer-readable medium of claim 17, wherein automatically selecting the machine learning model comprises, for each of the one or more machine learning models:
additionally training a respective one of the one or more machine learning models using at least a second portion of the input data,
wherein generating the respective metric value indicating the performance of the machine learning model is performed using the respective trained machine learning model.

19. The at least one non-transitory computer-readable medium of claim 17, wherein automatically selecting the machine learning model is performed according to a machine learning workflow specification.

20. The at least one non-transitory computer-readable medium of claim 19, wherein the operations further comprise:
displaying a plurality of user selectable categories of components of a machine learning application, each user selectable category of components comprising one or more components each comprising an input data port and an output data port;
receiving first user selections of one or more components of the first machine learning application from a respective user selectable category of the plurality of user selectable categories of components in response to displaying the plurality of user selectable categories;
receiving second user selections of one or more connections among the one or more components, wherein each of the second user selections defines a flow of data from an output data port of a first component of the one or more components in the first user selections to an input data port of a second component of the one or more components in the first user selections; and
generating the machine learning workflow specification based on the received first and second user selections.

21. The at least one non-transitory computer-readable medium of claim 19, wherein the operations further comprise:
validating each of the one or more connections in the second user selections by determining that a data type of the output data port of the first component of a respective connection matches a data type of the input data port of the second component of the respective connection.

22. The at least one non-transitory computer-readable medium of claim 19, wherein the operations further comprise:
displaying representations of the one or more components in the first user selections, wherein a representation of a component of the one or more components defines a user input area for obtaining one or more property values for the component; and receiving, via the user input area of the representation of the component, one or more property values for the component.

\* \* \* \* \*